(12) United States Patent
Sakurai

(10) Patent No.: US 7,519,289 B2
(45) Date of Patent: Apr. 14, 2009

(54) IMAGE CAPTURING DEVICE AND ACTIVATION METHOD WITH POWER SAVING STATE AND POWER SUPPLYING STATE

(75) Inventor: Masaki Sakurai, Tokyo (JP)

(73) Assignee: Sony Corporation (JP)

( * ) Notice: Subject to any disclaimer, the term of this patent is extended or adjusted under 35 U.S.C. 154(b) by 509 days.

(21) Appl. No.: 11/434,542

(22) Filed: May 15, 2006

(65) Prior Publication Data

US 2006/0285843 A1    Dec. 21, 2006

(30) Foreign Application Priority Data

May 16, 2005   (JP) ............................ P2005-142965

(51) Int. Cl.
 *G03B 7/26*   (2006.01)
(52) U.S. Cl. ...................................... 396/303; 396/301
(58) Field of Classification Search ................ 396/129, 396/301–304, 429; 348/372
See application file for complete search history.

(56) References Cited

U.S. PATENT DOCUMENTS 5,701,527 A * 12/1997 Sakabe et al. ............... 396/277
5,708,882 A *  1/1998 Yokonuma et al. .......... 396/296
6,016,407 A *  1/2000 Tsukahara ................... 396/302
7,123,829 B2 * 10/2006 Ohsuga ....................... 396/301
7,283,738 B2 * 10/2007 Ohsuga ....................... 396/303

FOREIGN PATENT DOCUMENTS

| CN | 1571457 A   | 1/2005  |
|----|-------------|---------|
| JP | 2002-290802 A | 10/2002 |
| JP | 2003-274640 | 9/2003  |

\* cited by examiner

*Primary Examiner*—Jay M Patidar
(74) *Attorney, Agent, or Firm*—Lerner, David, Littenberg, Krumholz & Mentlik, LLP

(57) ABSTRACT

An image capturing device includes a first controller operable to control image capturing; an operation section including a switch; a detector operable to detect a change to an image capturing mode and to send a signal representing the change; a second controller operable to monitor and process the sent signal, the second controller having a power consumption less than that of the first controller; and a power supply operable to supply power to the first controller, the second controller, and a functional section of the device. When the second controller receives the signal sent from the detecting section in a power saving state in which power is supplied from the power supply to the second controller, the power saving state is changed to a power supplying state capable of image capturing by supplying power from the power supply to portions of the device including the first controller.

7 Claims, 16 Drawing Sheets

IMAGE CAPTURING DEVICE AND ACTIVATION METHOD WITH POWER SAVING STATE AND POWER SUPPLYING STATE

CROSS-REFERENCE TO RELATED APPLICATIONS

The present application claims priority from Japanese Patent Application No. JP 2005-142965 filed on May 16, 2005, the disclosure of which is hereby incorporated by reference herein.

BACKGROUND OF THE INVENTION

The present invention relates to a technology, used in an image capturing device, for enhancing its activating functionality so as not to fail to capture a desired image of a subject or the like and preventing unnecessary power consumption in a standby state of the image capturing device before it enters an image capturing mode.

A camera-device configuration (see, for example, Japanese Unexamined Patent Application Publication No. 2003-274640) is known which shortens an activation time that is necessary from the time a power-on operation is performed on a camera device until the camera device is actually switched on for use.

When a power supply switch is operated, chattering in which intermittent opening and closing of a contact is repeatedly performed occurs, thus causing a false operation, etc. Accordingly, after a time passes until effects of the chattering disappear, a process (so-called "chattering preventing process") that determines whether the power supply switch is opened or closed is performed. In addition, when it is determined that the power-on operation has been performed, a system initializing process is performed after power supplied by a system's power supply unit becomes stable. After that, the camera device is in a state capable of processing such as image capturing. In other words, it is difficult to perform an operation or processing desired by a user unless a time represented by "T1+T2+T3" passes after a power-supply operation time at which a power-supply operation is performed, where T1 represents a time necessary for the chattering preventing process, T2 represents a time necessary until the power supplied by the power supply unit becomes stable, and T3 represents a time necessary for the system initializing process.

Therefore, by performing the chattering preventing process after turning on the power supply switch and the system initializing process in parallel, an activation time from the power-supply operation time until the operation or processing desired by the user is initiated can be shortened. In other words, by employing a sequence that performs system initialization as background processing for the chattering preventing process, after the power is supplied to the system, the system can be initialized without waiting for the chattering preventing process to finish. For example, when T1<T3, the activation time can be shortened to a time represented by "T2+T3" or approximately a time obtained by adding some value to "T2+T3."

However, the image capturing device of the related art has the following problems in its activating functionality and power saving function.

For example, cases in which the user misses a shutter release opportunity include a situation in which, when the power of the device is off at the time the user finds a desired subject, the user fails to capture an image of a subject due to a long time taken after the user holds the device until the device is ready for image capturing. In other words, a time necessary for activation after pressing the power supply switch is no more than approximately one second, even if the activation is fast, so that it is difficult to capture an image of a subject (or the like) passing in a moment. This is because it is difficult to reduce the activation time to zero in an actual device. To prevent the user from missing the shutter release opportunity, the system power needs to be continuously on or the device needs to be in a suspend state. The suspend state means a state in which, although an operation of a control unit such as a CPU (central processing unit) is stopped, the power of each portion of the system is on.

As described above, to reduce the activation time close to zero, an increase in power consumption is extremely important and necessary in compensation for the reduction. Therefore, when a battery-driven portable device is used, it is necessary for a user to carry many charged batteries or to use a mass storage battery. In a digital camera or the like, a device power-saving function is important for capturing as many images as possible. Thus, shortening of the activation time and the need of power saving conflict with each other.

Accordingly, it is desirable to satisfy both an improvement in activating functionality and power saving in an image capturing device.

SUMMARY OF THE INVENTION

To solve the above problems, according to an embodiment of the present invention, there is provided an image capturing device including first control means for controlling image capturing, the first control means having a first power consumption; operation means including a switch; detecting means for detecting a change to an image capturing mode and for sending a signal representing the change to the image capturing mode; second control means for monitoring and processing the signal sent from the detecting means, the second control means having a power consumption less than the first power consumption; and a power supply for supplying power to the first control means, the second control means, and a functional section of the image capturing device.

In the image capturing device, a power saving state is changed to a power supplying state capable of image capturing by supplying power from the power supply to portions of the image capturing device including the first control means when the second control means receives the signal representing the change to the image capturing mode from the detecting means.

According to another embodiment of the present invention, there is provided an activation method for an image capturing device having a function of controlling power supplying states including a first power control state capable of image capturing, the first power control state having a first power consumption, and a second power control state having a power consumption less than the first power consumption. The activation method includes, in the second power control state, monitoring a switch operation and a change to an image capturing mode; and, when the change to the image capturing mode is detected in the second power control state, changing the second power control state to the first power control state.

Accordingly, in an embodiment of the present invention, at the time a second control means receives a detection signal representing a change (changing start) to an image capturing mode, power supply control for enabling image capturing is performed. After changing to a first power control state, image capturing is immediately initiated. In a second power control state, power is supplied only to the second control means and power does not need to be continuously supplied to the first control means and the second control means. This contributes to reducing power consumption in a standby state before image capturing.

According to an embodiment of the present invention, by initiating preparation for image capturing at the time the setting of an image capturing mode is detected, activating functionality can be enhanced. In addition, it is not necessary to set a power supplying state capable of image capturing at all times. When image capturing is not performed, by setting a standby state having low power consumption, a power saving effect can be obtained. In other words, since it is difficult to reduce an activation time itself to zero, by changing to the first power control state while using, as a start point, the time the change to the image capturing mode is detected, both an improvement in activating functionality and power saving can be achieved.

For example, after changing to a power supplying state capable of image capturing, when a power supplying operation is not performed, or a signal representing a change to an image capturing mode is not detected, by shutting off power supplied to the first power control means to change to the power saving state, power consumption in the standby state can be reduced. In other words, after changing to the first power control state, when a power supplying operation is not performed, or a signal representing a change to an image capturing mode is not detected, by determining that there is no intention of image capturing or a high probability of no intention, it is preferable to change to the second power control state (power saving state).

In addition, according to a configuration in which a sensor for detecting contact with a device is provided as the detecting means for detecting the change to the image capturing mode, when it is detected, as a preliminary image capturing step, that the image capturing device is touched by a user, the device can be changed to the first power control state. Alternatively, according to a configuration in which a sensor for detecting a change in the attitude of a body of the device is provided as the detecting means, when it is detected, as a preliminary image capturing step, that the image capturing device is held or moved by the user, the device can be changed to the first power control state. Furthermore, by employing a detecting form that is a combination of these sensors, detection accuracy can sufficiently be enhanced.

In order to obtain a power saving effect in a standby state in which image capturing is not performed, it is preferable that, when the second control means receives a signal representing a change to an image capturing mode from detecting means, a power-supply-instruction signal be sent from the second control means to a power supply after a resting state of the second control means is canceled.

DETAILED DESCRIPTION

In an embodiment of the present invention, by immediately controlling power supply when detecting setting of an image capturing mode with a detecting unit such as an electrostatic sensor or angular velocity sensor, image capturing can be initiated after necessary processing such as initialization. For example, at the time a user holds a camera, supplying of power to each portion of a camera system and an initializing process are initiated, whereby it takes almost no waiting time after operating a power supply switch until operating a shutter release button. This can prevent occurrence of a situation in which the user misses a shutter release opportunity. An embodiment of the present invention is widely applicable to still cameras and camcorders, or to various types of image capturing devices that can capture still and moving images.

Figure 1:
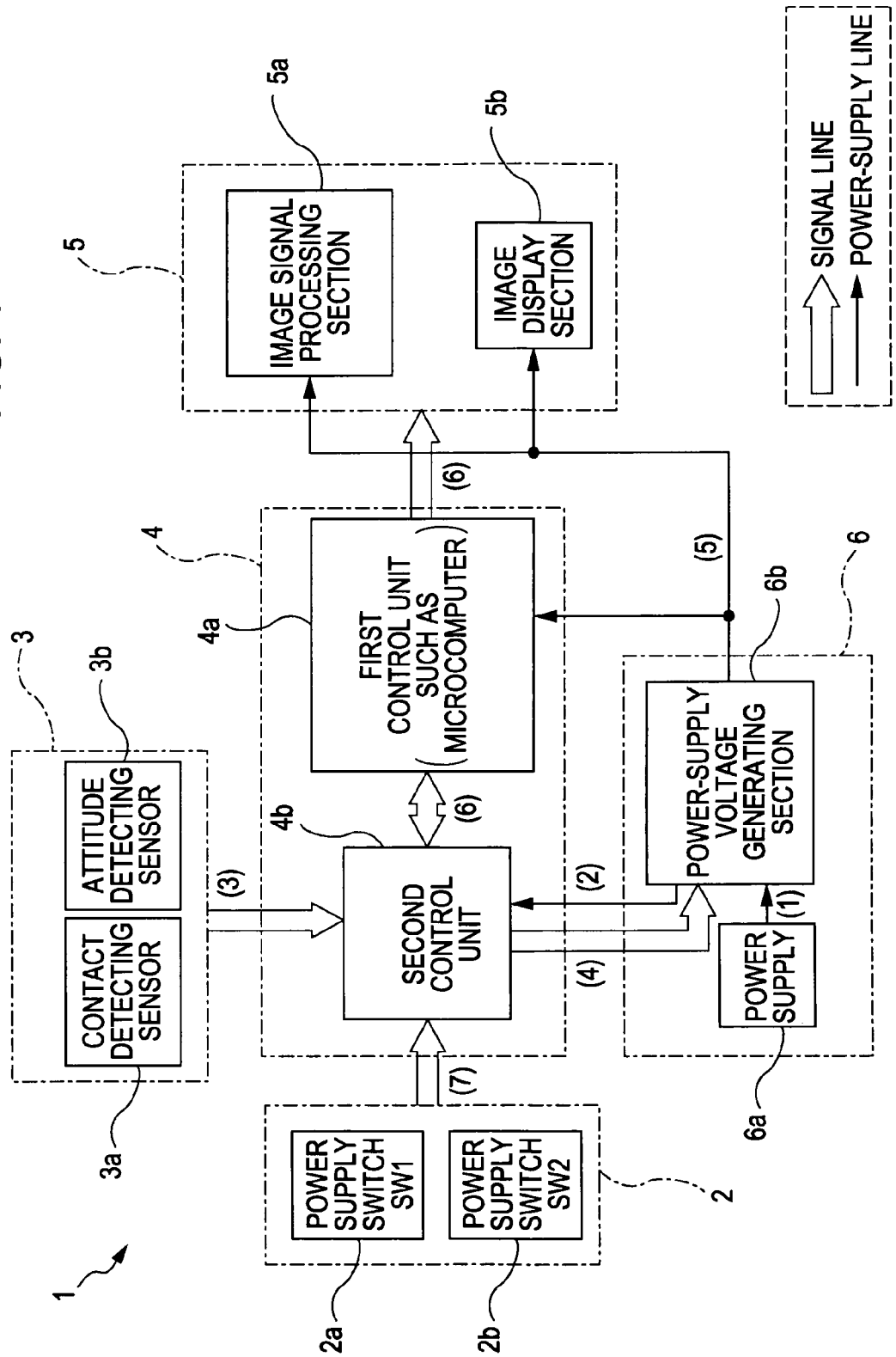
FIG. 1 is a block diagram showing an example of a basic configuration of an image capturing device according to an embodiment of the present invention.

FIG. 1 shows an example of a basic configuration of an image capturing device according to an embodiment of the present invention.

An image capturing device 1 includes an operation unit 2 including power supply switches and a detecting unit 3 using an electrostatic sensor, an angular velocity sensor, etc. Signals sent from these sensors are sent and processed in a system controller 4.

The operation unit 2 includes various types of operation buttons and switches provided on the image capturing device 1. In FIG. 1, only power supply switches 2a and 2b are shown. An operation signal from a power supply switch (or a power switch) serves as a trigger signal for supplying power. When an embodiment of the present invention is applied to, for example, a digital still camera, the number of power supply switches is not limited to one depending on a configuration form, but there is a system including a plurality of power supply switches. In this embodiment, two switches are shown.

The detecting unit 3 is provided to detect a change in mode to an image capturing mode. The detecting unit 3 may have the following forms:

(I) form using sensor for detecting contact with image capturing device 1;

(II) form using sensor for detecting change in attitude of image capturing device 1; and (III) form Using form (I) and form (II).

At first, in form (I), for example, a contact detecting sensor 3a such as an electrostatic sensor is used. The contact detecting sensor 3a detects contact of a user with the image capturing device 1, and sends a signal of the detection to the system controller 4. Excessive detection sensitivity causes a situation in which slight contact with the image capturing device 1 performs power supplying for activation, so that the frequency of false detection increases, etc. Thus, it is preferable to appropriately set the detection sensitivity to ensure contact detection.

Also in the above form (II), an attitude detecting sensor 3b, such as an angular velocity sensor or gyrosensor, is used. The attitude detecting sensor 3b detects a change in device attitude when the image capturing device 1 is held or moved by the user, and sends a signal of the detection to the system controller 4. Cases to which an embodiment of the present invention is applied include a form in which, not only the angular velocity sensor, but also an acceleration sensor is used as a sensor capable of measuring a change in speed, and a form in which detection accuracy is enhanced by using a vibration sensor to increase the number of detection axes. Alternatively, in a camera device having an image stabilizing function, by using an angular velocity sensor and acceleration sensor provided for image stabilization to detect a change in device attitude, a detecting unit can be mounted without increasing the number of components and expense.

Improvement of the detection accuracy includes a method that uses a plurality of sensors of the same type in the above forms (I) and (II), and a method that uses sensors of different types in combination, as in form (III). When determination is multilaterally performed, the latter is more effective.

In FIG. 1, for brevity of description, form (III) is assumed, and an example of the detecting unit 3 in which it includes sensors of plural types is shown. In addition, forms of transmission from the detecting unit 3 to the system controller 4 include analog transmission and digital transmission (including binarization communication and serial communication), whose details are described later.

The system controller 4 includes a first control unit 4a and a second control unit 4b. The configuration of the system controller 4 has, for example, the following forms:

a form in which each control unit is formed as a separate circuit; and a form in which the system controller 4 is formed as a single chip and circuit portions having functions of both control units are formed in the single chip.

In either form, the first control unit 4a controls image capturing, or recording or playback of captured image data, and the second control unit 4b monitors and processes an operation input signal from the operation unit 2 and a detection signal from the detecting unit 3. For example, a microcomputer or the like may be used as the first control unit 4a. For example, an application specific IC (integrated circuit), a microcomputer (used as a sub-computer for a main-computer used as the first control unit 4a), or the like, may be used as the second control unit 4b.

In a system configuration unit 5 under the control of the first control unit 4a, various types of components are used depending on the specifications and system configuration of the image capturing device 1. In this embodiment, an image signal processing section 5a and an image display section 5b are shown as typical examples. The image signal processing section 5a includes an image capturing unit, a camera signal processor, and a recording-and-playback-system signal processor, and performs image capturing, and image recording and playback, and, in the image display section 5b, an LCD (liquid crystal display) panel or the like is used.

A power supply 6 supplies power to the first control unit 4a, the second control unit 4b, and the system configuration unit 5. In application of an embodiment of the present invention, a power supply 6a in which, for example, a battery (primary battery or secondary battery), a fuel cell, or the like, is used, and a power-supply voltage generating section 6b (such as a DC-DC converter) for generating a power-supply voltage necessary for each circuit are provided irrespective of the circuit configuration of the power supply 6. The power-supply voltage generating section 6b supplies power to each circuit through power-supply lines.

In this embodiment, when the power supply 6a supplies power to the power-supply voltage generating section 6b in a state in which a battery pack or the like is installed in the image capturing device 1, power supply from the power-supply voltage generating section 6b to the second control unit 4b can be immediately performed.

The second control unit 4b has power consumption less than that of the first control unit 4a. This is because, since the second control unit 4b handles monitoring and processing the operation signal and the detection signal, unnecessary power consumption is prevented in a standby state before image capturing. When, for example, a microcomputer is used as the second control unit 4b, a consumption current is set to hundred microamperes or less.

Unlike that, an arithmetic operation unit having a fixed operating frequency, or an arithmetic operation unit in which power control can be performed by variably controlling an operating frequency is used as the first control unit 4a. When acceleration of processing or the like is preferentially performed, the power consumption of the first control unit 4a increases than that of the second control unit 4b. In other words, if the image capturing device 1 is set in a mode capable of image capturing at all times by performing a power-supply operation (by the user) to supply power to the first and second control units 4a and 4b, and the system configuration unit 5, a situation in which the user misses a shutter release opportunity can be avoided. However, power consumption in the above case is large, thus shortening a time in which the image capturing device 1 can be battery-driven. Accordingly, in the standby state before image capturing, by supplying power from the power supply 6a to the second control unit 4b having less power consumption, a power saving effect can be obtained.

In an embodiment of the present invention, in a power saving mode in which power is supplied from the power supply 6a to the power-supply voltage generating section 6b, when the second control unit 4b receives, from the detecting unit 3, a signal representing a change in mode to the image capturing mode, the power supply 6 supplies power to the first control unit 4a and the system configuration unit 5, and the power saving mode subsequently changes to a power supplying state capable of image capturing. Specifically, power control states of the image capturing device 1 include at least the following states:

a first power control state (hereinafter referred to as "1S") in which the image capturing device 1 is capable of image capturing; and a second power control state (hereinafter referred to as "2S") having power consumption less than that in 1S.

In 1S, power supply from the power supply 6 to the system controller 4 and the system configuration unit 5 is performed, so that power consumption is greater than that in 2S.

Also, in 2S, power supply from the power supply 6 to the second control unit 4b is performed and power supply to the first control unit 4a and the system configuration unit 5 is not performed. In other words, 2S is a power saving state which monitors a switch operation by the operation unit 2 and a change in mode to the image capturing mode by the detecting unit 3. When the change in mode to the image capturing mode is detected in this control state, that is, when a detection signal by the detecting unit 3 is sent as a trigger signal to the second control unit 4b, control of change from 2S to 1S is performed.

This performs power supplying to the first control unit 4a and initialization, power supplying to the system configuration unit 5, etc. After that, the image capturing device 1 changes to the power supplying state capable of image capturing. In this state, by turning on the power supply switch and pressing a shutter release button, image capturing can be instantly initiated. In addition, in 1S, when the power-supply operation by the power supply switch is not performed, or the signal from the detecting unit 3 which represents the change in mode to the image capturing mode is not received, 1S automatically changes into 2S. In other words, by shutting off supplying the power to the first control unit 4a and the system configuration unit 5, 1S changes into the power saving state (2S).

For brevity of description, in only 1S, the image capturing can be performed. However, in application to a configuration form in which a power saving effect can be set in stages or continuously by operating frequency control or device power-supplying control, the power control state can be divided depending on the level of the power consumption. Specifically, 1S can be divided into two or more classes.

Although, in this embodiment, a configuration in which the operation signal with the power supply switch 2a is sent and processed in the second control unit 4b has been described, the embodiment of the present invention can be practiced in various configurations such as a configuration in which the operation signal from the power supply switch 2a is sent and processed in the first control unit 4a.

Next, an example of a power-supply control sequence of the image capturing device 1 is described below, with it divided into the following three cases:

(a) case A in which, after detecting that the image capturing mode is set, the power supply switch 2a is operated by the user to initiate image capturing;

(b) case B in which, although it is detected that the image capturing mode is set, the power supply switch 2a is not operated by the user after that; and (c) case C in which detection of the image capturing mode in being set and a user's operation on the power supply switch 2a are performed approximately at the same time.

At first, case A is described in accordance with the following steps (1) to (7). In FIG. 1, the numerals in the parenthesized symbols correspond to the following parenthesized numerals 1 to 7, respectively, and represent processing order with the lapse of time.

(1) By inserting a battery into the power supply 6, the power of the power-supply voltage generating section 6b is turned on.

(2) Power supply from the power-supply voltage generating section 6b to the second control unit 4b is performed, whereby the second control unit 4b is ready to receive the operation signal from the power supply switch 2a.

(3) The second control unit 4b is notified by the detecting unit 3 that the image capturing device 1 is in the image capturing mode. For example, in form (I), an electrostatic sensor or the like is used for detecting contact with the image capturing device 1. In other words, detection of contact with the image capturing device 1 by using the sensor performs system activation. For example, a system activation process is performed as a background process. In addition, in form (II), an angular velocity sensor or the like is used for detecting a change in attitude of the image capturing device 1. Detection with the sensor of a state in which the image capturing device 1 is raised by the user and is ready for image capturing, system activation is performed. For example, a system activation process is performed as a background process.

When receiving, from the detecting unit 3, a signal indicating that the image capturing mode is set, the second control unit 4b instructs the power-supply voltage generating section 6b to perform power supply to the first control unit 4a and the system configuration unit 5 by sending a signal to the power-supply voltage generating section 6b.

(5) After being instructed by the second control unit 4b, the power-supply voltage generating section 6b initiates supplying power to the entire system. In other words, power is supplied to the first control unit 4a and the system configuration unit 5.

(6) When the entire system is sufficiently supplied with power, each component is operable, thus enabling signal transfer between the first control unit 4a and the second control unit 4b, and signal transfer between the first control unit 4a and each of the image signal processing section 5a and image display section 5b of the system configuration unit 5.

(7) When the power supply switch 2a is operated by the user, a signal of the operation is transferred to the second control unit 4b. The signal is transferred from the second control unit 4b to the first control unit 4a, so that the image capturing device 1 instantly changes into a state capable of initiating image capturing.

In this embodiment, when the detecting unit 3 detects that the image capturing mode is set in the image capturing device 1, power can be supplied to the components including the first control unit 4a in such a manner that the second control unit 4b instructs the power-supply voltage generating section 6b. However, the sequence is not limited thereto, but may employ a method in which the system is set to a suspend state before image capturing and a method in which the operating speed of the first control unit 4a is reduced. In this case, when the detecting unit 3 detects that the image capturing mode is set in the image capturing device 1, the system is returned to a state capable of image capturing, or an increased operating speed of the first control unit 4a sets the image capturing device 1 to be in an image capturing state without any difficulty. Hence, although a time necessary for system activation is shortened, in the standby state in which it is not detected that the image capturing mode is set, power consumption increases compared with the above case.

Next, although, in case B, for example, when the user touches the image capturing device 1 but does not press any power supply switch, the steps (1) to (6) are performed, power is consumed more than necessary if the system is being activated in this state. Accordingly, when the power-supply operation is not performed, or the signal from the detecting unit 3 that represents a change in mode to the image capturing mode is not set, the present state is changed to the above 2S (power saving state). For example, in cases such as when a detection signal representing a touch of the user on the image capturing device 1 is not sent to the second control unit 4b during a predetermined time, power to the first control unit 4a and the system configuration unit 5 is shut off without any explicit operation instruction. For example, supplying of power to the portions of the system excluding the second control unit 4b is stopped in the background processing without notifying the user. In this state, under the control of the second control unit 4b, the image capturing device 1 is set in a mode that monitors an operation signal and a detection signal. The power consumption is at a minimum level that is necessary for processing by the second control unit 4b. After that, when a touch of the user on the image capturing device 1, that is, the image capturing mode in being set in the image capturing device 1, the process proceeds from step (3) to step (4) and thereafter.

In case C, for example, when a state in which the user touches the image capturing device 1 and a state in which the user presses the power supply switch occur simultaneously or approximately simultaneously, the system activating process is performed as in the related art, and the image capturing mode is set in the image capturing device 1 without any difficulty. In other words, in a configuration form in which the second control unit 4b continuously monitors an operation signal and a detection signal, the start of changing to the image capturing mode is detected by the detecting unit 3, and, even if the power supply switch 2a is simultaneously pressed, both can be grasped by the second control unit 4b. Thus, after changing "7" in the parenthesized symbol in FIG. 1 to "3," processing after the above (4) is performed.

When the start of changing to the image capturing mode is not detected at all, for example, when the user does not touch the image capturing device 1 in form (1), in the above (3), a detection signal indicating that the image capturing mode is set in the image capturing device 1 is not sent to the second control unit 4b. Thus, system activation, that is, supplying power to the first control unit 4a, an initializing process, and supplying power to each portion of the system configuration unit 5 are not performed (the image capturing device 1 enters a power-controlled state in which the power consumption is the lowest).

Although various states depending on usage of the image capturing device 1 are assumed, the second control unit 4b sets power management and a power control sequence, whereby, in any state, the image capturing device 1 can be changed to a state capable of image capturing by activating the system without any difficulty.

FIGS. 2A to 16 show an example in which an embodiment of the present invention is applied to a digital camera or the like.

Figure 2A:
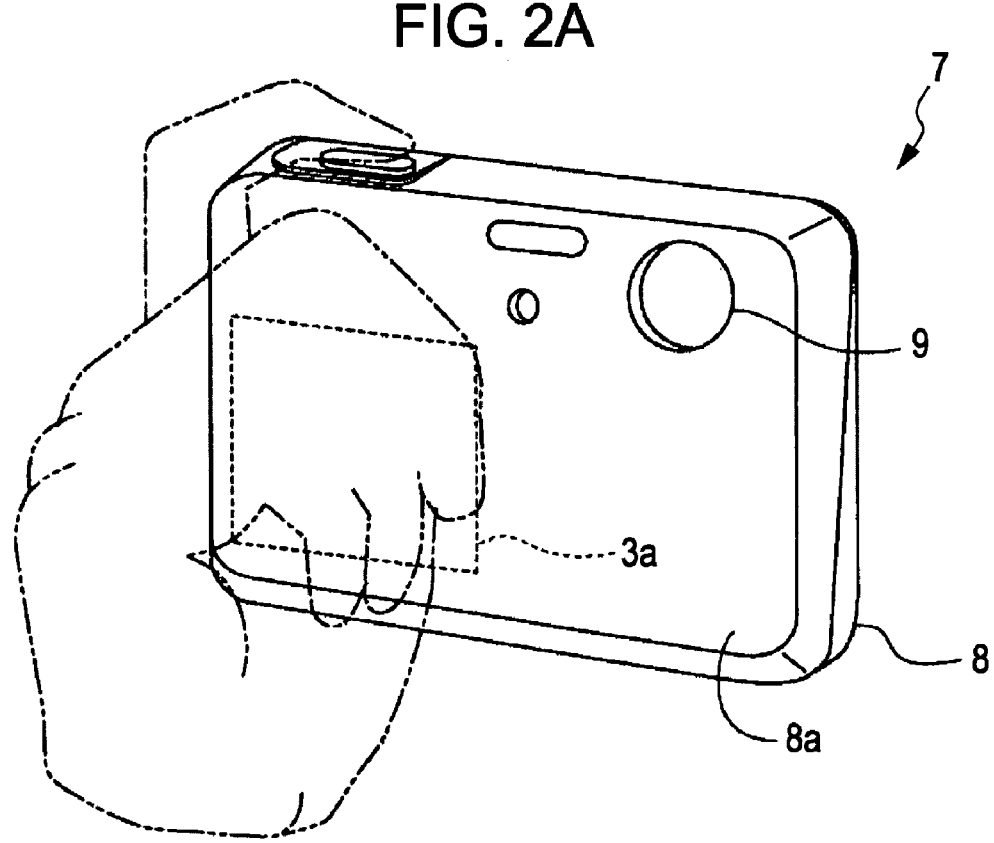
FIGS. 2A and 2B are perspective views showing contact detection in a camera according to an embodiment of the present invention.
Figure 2B:
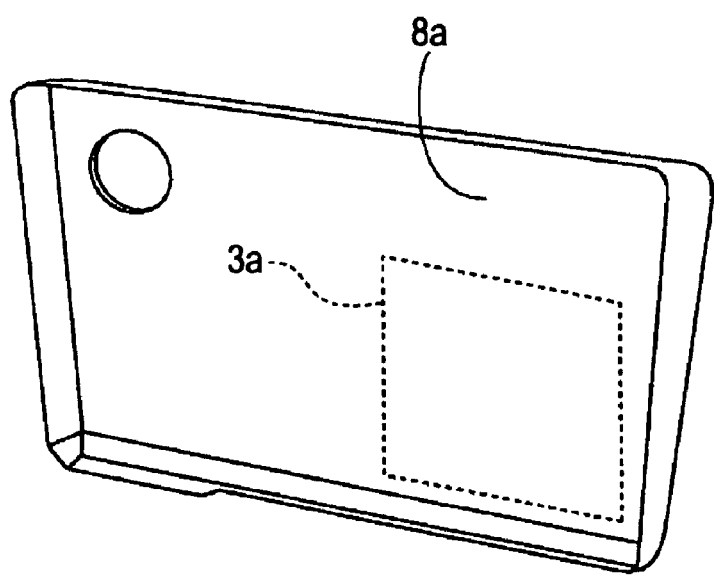

FIGS. 2A and 2B show, as an example of form (I), an example of a configuration using an electrostatic sensor or the like. FIG. 2A is a perspective view of a camera 7, and FIG. 2B is a perspective back view of a front portion 8a of a camera housing 8.

In this embodiment, an image capturing portion 9 is provided on the front portion 8a, and in the front portion 8a, the contact detecting sensor 3a, such as an electrostatic sensor, is embedded in an area in which user's fingers touch a back side in the image capturing mode.

In this case, it is important to know contact of the user's fingers without false detection. In other words, excessively enhancing the sensitivity of a sensor IC (or the like) mistakenly detects approach of a part of a human body other than the fingers.

Accordingly, it is preferable to lower the sensor sensitivity and it is preferable to broaden a sensor-detecting area, that is, an area for sensing a touch of the user. For example, an amount of detection (electrostatic amount) obtained when the user's fingers touch the area is stored and, when the amount of detection exceeds a predetermined threshold value, it can be determined that the amount of detection represents the start of changing to the image capturing mode. When the amount of detection is equal to or less than the threshold value, it can be determined that the amount of detection represents unexpected contact or approach, or the like.

This embodiment has no problem when a housing is made of, for example, synthetic resin such as plastic. The housing may be coated with an electrostatic shield depending on a device form, and it is difficult to uses the electrostatic sensor to detect contact.

Figure 3A:
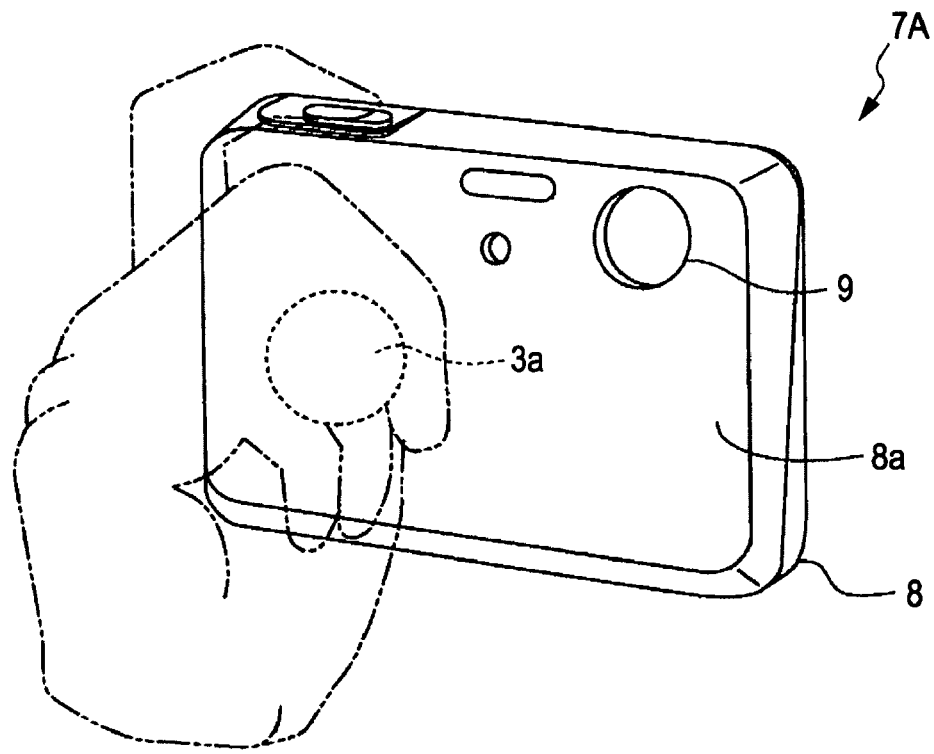
FIGS. 3A and 3B are illustrations of a different example of the contact detection in a camera according to an embodiment of the present invention.
Figure 3B:
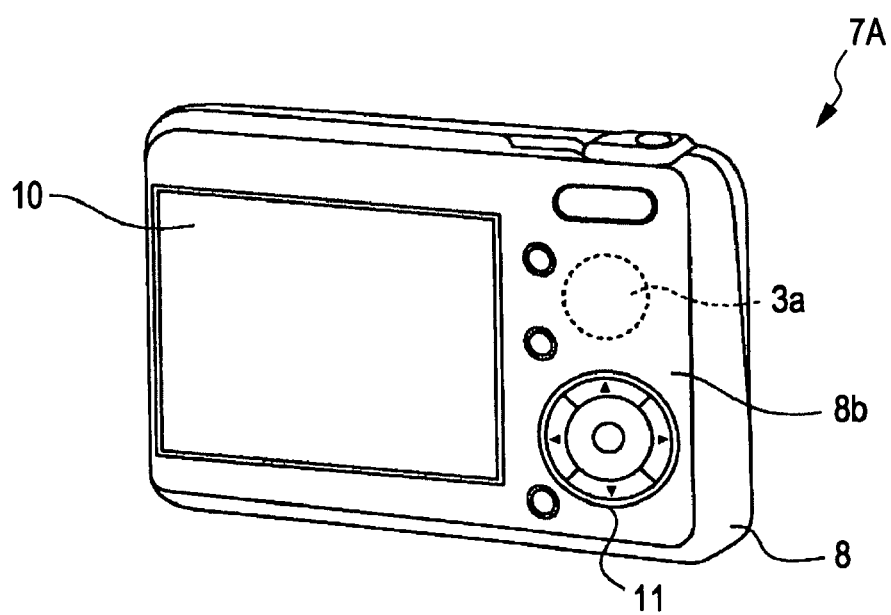

In such a case, a configuration in which, as shown in FIG. 3A, the contact detecting sensor 3a is embedded in a surface of a portion that the user's fingers touch, for example, the front portion 8a, is employed, and a configuration in which, as shown in FIG. 3B, the contact detecting sensor 3a is embedded in a back portion 8b, in which a display portion 10 and an operation portion 11 are provided, is employed. For example, an electrically conductive film element may be used as a detecting element. However, the detecting element is not limited to the film element but a detecting element formed of various electrically conductive materials may be used.

Figure 4:
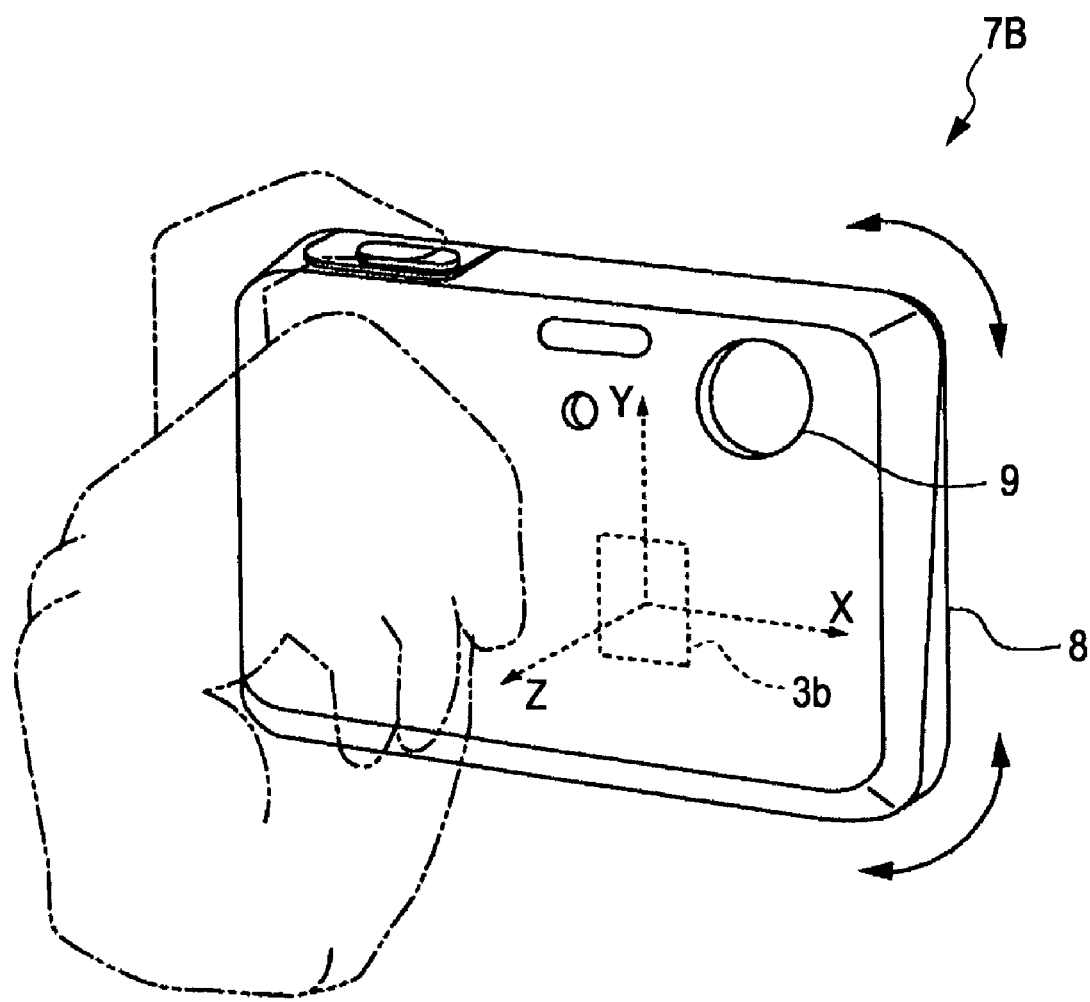
FIG. 4 is an illustration of attitude detection in a camera according to an embodiment of the present invention.

FIG. 4 shows, as an example of form (II), an example of a configuration using a triaxial acceleration sensor.

In a camera 7B in this example, an attitude detecting sensor 3b that is provided on a front portion 8a or a back side thereof detects changes in X, Y, and Z axes shown in FIG. 4. In other words, user's entering the image capturing by holding the camera 7B is detected as a change in speed caused by a change in attitude, that is, acceleration.

The configuration is not limited to the use of the triaxial sensor but a biaxial angular velocity sensor or the like may be used. In addition, an angular velocity sensor and acceleration sensor for detecting motion blurring may also be used. The more the number of axes for detection is, the higher accuracy the detection can have. However, considerations, such as reserving an installation space and an increase in cost, are necessary.

Figure 5:
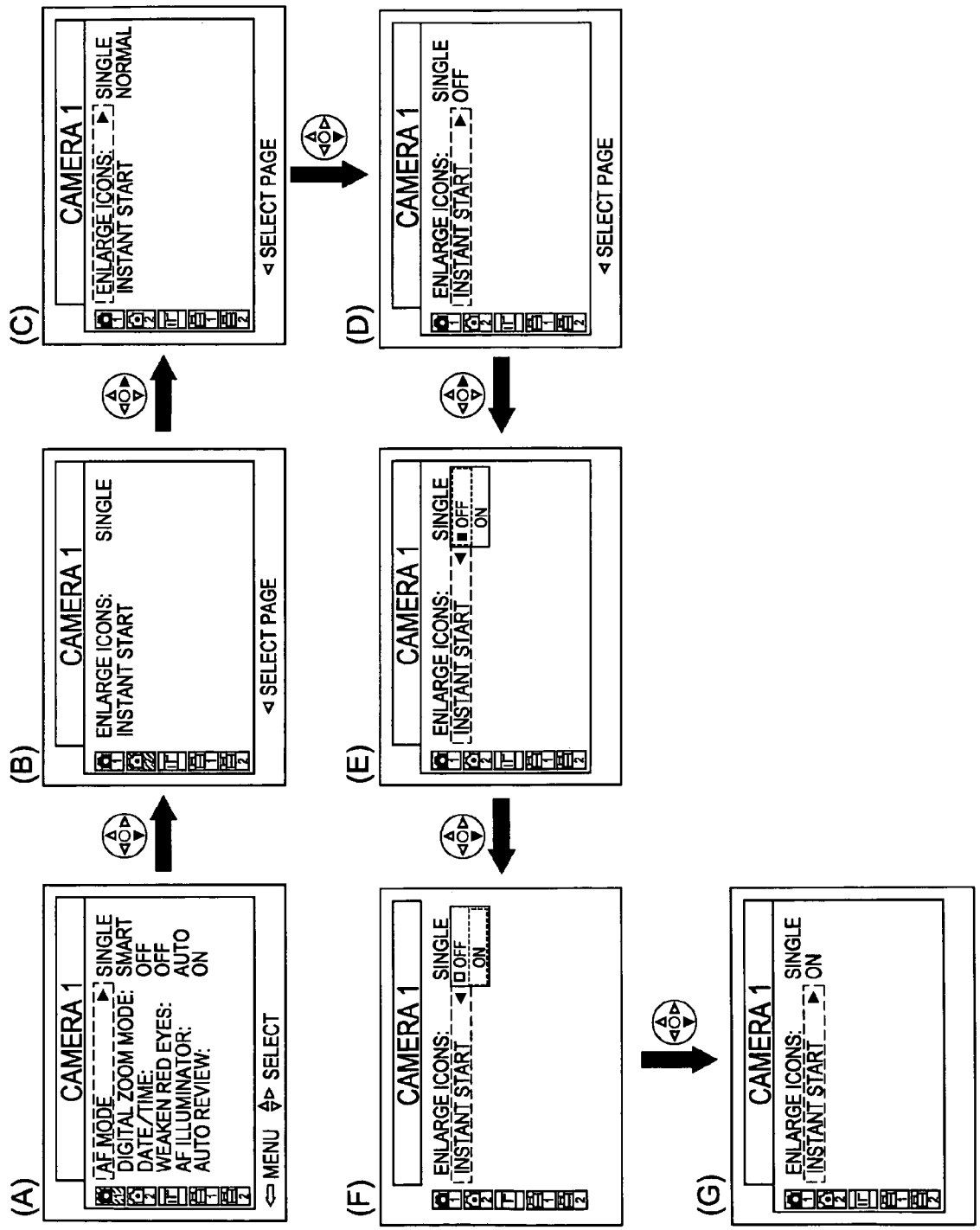
FIG. 5 is an illustration of examples of screens for activation settings.

Next, an example of settings concerning system activation is described in accordance with examples of screens shown in portions (A) to (G) of FIG. 5. Although applying an embodiment of the present invention is irrelevant to a system activation setting method, places for settings, etc. In the following examples, a case in which a new item (hereinafter referred to as "INSTANT START") is added to a setting screen displayed on a display portion is described below.

Portion (A) of FIG. 5 shows a screen displayed at the time of changing to a setup screen. A range indicated by the broken line rectangle indicates an item being presently selected by a user.

When the user uses an operation portion (see, for example, the operation portion 11 shown in FIG. 3B), such as a cross key, to perform a "downward" operation, a selected position of an indicator (icon) on a left tool bar downwardly moves, and the screen displayed in portion (B) of FIG. 5 is displayed. In part of the screen on the right side of the indicator, the item "INSTANT START" is displayed.

When the user uses the operation portion, such as the cross key, to perform a "right directional operation" while intending to select "INSTANT START," as shown in portion (C) of FIG. 5, the item "ENLARGE ICONS" at the top of a main part of the screen is selected. However, what the user intends to select is not the item. Accordingly, by using the cross key to perform a "downward" operation, as shown in portion (D) of FIG. 5, the cursor is moved to the item "INSTANT START" (this item is set to "NORMAL" in this example).

When the user operates the "right" directional operation in a state in which the cursor is positioned at the item "INSTANT START," as shown in portion (E) of FIG. 5, it can be selected whether to enable (see "ON" in portion (E) of FIG. 5) or disable (see "OFF" in portion (E) of FIG. 5) the setting of "INSTANT START."

Since, in this example, the item has been set to "OFF," the user uses the cross key to perform the "downward" operation. In this operation, as shown in portion (F) of FIG. 5, the setting can be enabled, that is, the cursor can be positioned at "ON."

When the user intends to confirm the selected item, that is, the item "INSTANT START" needs to be set to "ON," by pressing a center portion (determination button) of the cross key, the screen displayed in portion (G) of FIG. 5 is displayed and the setting operation finishes.

These consecutive operations can set the item "INSTANT START" to be enabled ("ON").

Although, in this example, in selecting "INSTANT START," its enabling or disabling is displayed with a name of "ON" or "OFF," obviously, the name, settings, etc., can be freely altered in accordance with an application design. In addition to a form in which item setting is performed on the setup screen, enabling in various configurations is possible such as a configuration provided with a dedicated toggle button and a configuration in which, by providing a contact detecting unit, such as a touch panel, on a display surface, a desired item can be selected on a screen by the user.

Figure 6:
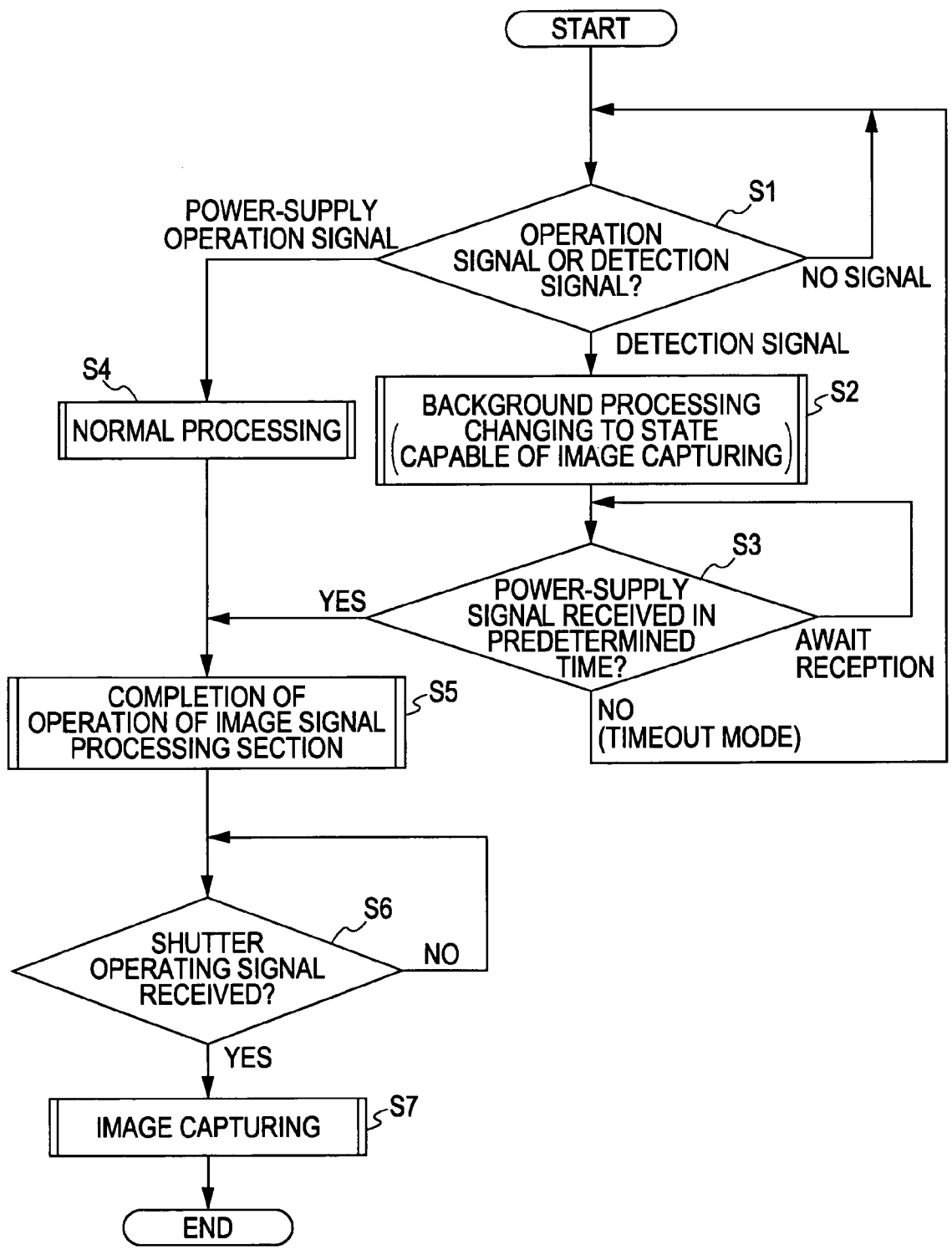
FIG. 6 is a flowchart showing a system activating process.

FIG. 6 is a flowchart illustrating the system activating process.

In step S1, it is determined whether or not an operation signal from a power supply switch or a detection signal from a contact detecting sensor or attitude detecting sensor has been sent to the system (see, the second control unit 4b in FIG. 1). If the operation signal or the detection signal has been sent, the process proceeds to step S2 or S4. If not, monitoring the operation signal or the detection signal is continued (this state corresponds to the control state 2S and the power saving mode is set).

When changing to the image capturing mode is predicted on the basis of the detection signal, the process proceeds to step S2 and supplying power to the system controller 4 and a system configuration unit and initialization are initialized as background processing. In addition, in a predetermined time, for example, within one second), a state capable of image capturing is set (this state corresponds to the control state 1S), and the process proceeds to step S3.

When a power-supply instruction is issued by operating an operation switch, the process proceeds to step S4, and the system activation process is normally performed (this is similar to that in the related art) before the process proceeds to step S5.

In step S3, it is determined whether or not the operation switch has been operated within a predetermined time. In addition, when the power-supply instruction has been issued before a predetermined set time passes, the process proceeds to step S5. Even if the set time has passed (at timeout), when the power-supply instruction has not been issued, the process returns to step S1. Determination of whether the operation signal from the operation switch has been sent is performed until the set time passes.

In step S5, an operation of the system configuration unit, for example, the image signal processing section 5a, is completed, and a backlight or the like included in the image display section 5b emits light to display a screen.

It takes almost no time from the time the power supply switch is performed in step S3 until changing to step S5 is performed. In other words, instantly after the user operates the power supply switch, image capturing preparation is established.

Processing to step S6, it is determined whether or not an image-capturing-instruction signal has been sent to the system by pressing a shutter release button. If the image-capturing-instruction signal has been sent to the system, the process proceeds to step S7 and an image capturing process is initiated.

When, in step S1, both the operation signal from the power supply switch and the detection signal from the sensor are approximately simultaneously input, for example, the operation signal from the power supply switch is preferentially used and the process proceeds to S4.

This example has a feature in processing path proceeding from step 1S in the order of "steps S2, S3, and S5." In a configuration of the related art, even if, in step S1, the power supply switch is operated so as not to miss capturing an image of a subject, it is difficult for the process to proceed to step S5 unless the waiting time in step S4 passes. Accordingly, a situation in which a shutter release opportunity is missed during that time occurs.

Next, an example of a configuration in which a signal detected by using an electrostatic sensor or angular velocity sensor concerning changing to the image capturing mode is sent to the system controller 4 is described.

Transmitting forms for using the angular velocity sensor or the like to notify the system that the user holds and sets a camera to be ready for image capturing include, for example, the following systems:
(1) analog system; and
(2) digital systems:
   (2-1) binarization system; and
   (2-2) serial system.

Comparisons in power among the systems are represented by "the (1) analog system" >"the (2-2) serial system" ≧"the (2-1) binarization system." As is clear, the digital systems are less in power consumption than the analog system. This is because power is increased for reasons such as the need to cause an A/D converter to operate. In addition, in the binarization system, detection in the system is simple since two signal levels, High and Low, are used. Accordingly, it has an advantage in that, in a state in which image capturing is not performed, the system is continuously set in a sleep mode.

Figure 7:
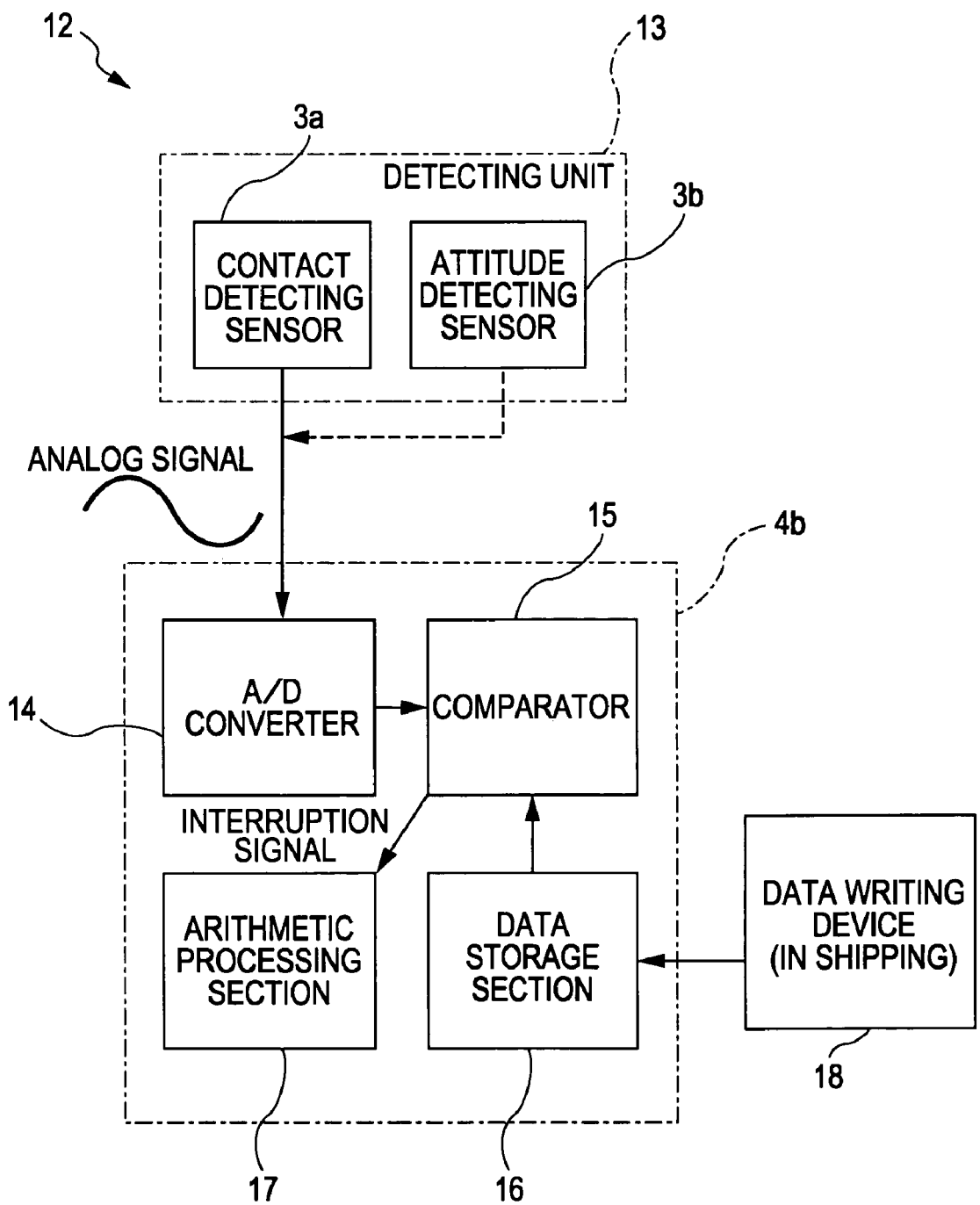
FIG. 7 is a block diagram showing a main part of a configuration example.

FIG. 7 is a block diagram showing a configuration example 12 in the (1) analog system, and shows a detecting unit 13 and the second control unit 4b in the system controller 4.

In the detecting unit 13, for example, an electrostatic sensor serving as a contact detecting sensor 3a, an angular velocity sensor serving as an attitude detecting sensor 3b, etc., are used, and each sensor output is sent as an analog signal to an IC or computer forming the second control unit 4b.

The second control unit 4b includes, in its circuit configuration, an A/D converter 14, a comparator 15, an arithmetic processing section 17 (such as a CPU (central processing unit) core, or an ASIC (application specific IC)).

The A/D converter 14 receives and converts the analog signal from the detecting unit 13 into a digital signal, and sends the digital signal to the comparator 15.

In a data storage section 16, threshold data to be sent to the comparator 15 is stored by using a data writing device 18. As the data storage section 16, for example, a nonvolatile storage device, such as an EEPROM (electronically erasable and programmable read only memory), is used. By writing threshold data in shipping in units of devices, a problem of detection error caused by variation in sensor characteristics and device-unique variation in production, malfunction, or the like, can be prevented (reliability is enhanced compared with a case using the same threshold data at all times). In addition, forcing surface mounted components to be changed after a product is completed needs a component cost and time, thus causing a production cost. However, ability to use software processing with a CPU to alter set values or the like by writing data to the nonvolatile storage device produces an advantage in that, even after hardware is completed, adjustment, setting alternation, etc., can be freely performed. In addition, by describing conditional branching in a program concerning ambient environments such as an outside air temperature, flexible responses can be performed.

Threshold data read from the data storage section 16 is sent to the comparator 15 and is compared with data (sensor detection data) digitized by the A/D converter 14. When the detection data satisfies a condition represented by the threshold data, it is recognized that, for example, the user touches a predetermined area of the camera, or changing to the image capturing mode is initiated such that the user holds the camera, and an interruption signal to the arithmetic processing section 17 is generated. In addition, when the detection data does not satisfy the condition represented by the threshold data, it is determined that the image capturing mode is not set, or temporary or accidental contact or change in attitude or disturbance such as noise occurs.

In response to the interruption signal from the comparator 15, a sleep state of the CPU core forming the arithmetic processing section 17 is canceled (wakeup), and a system operation is performed with original performance that can be exhibited.

Detection data sampling may be performed in a wakeup state at all times without setting the CPU core or the like to be in the sleep state, but power consumption at that time is an issue. In other words, when power consumed for a continuous operation of the CPU core, ASIC, or the like, is an issue, it is preferable to sufficiently lower the operating frequency, or it is preferable to set the CPU core or ASIC to the sleep state or a resting state so that power consumption is set to a value close to almost zero. However, since it is not allowed to stop supplying power to the A/D converter 14, the comparator 15, and the data storage section 16, minimum power at which comparison operations between data converted by the A/D converter 14 and the threshold data read from the data storage section 16 is guaranteed is consumed at all times. In other words, the second control unit 4b consumes only minimum necessary power in its standby state, and, when the second control unit 4b receives a signal representing changing to the image capturing mode from the detecting unit 13, the second control unit 4b cancels its resting state and sends a power-supply-instruction signal to a power supply. By performing an intermittent operation to such an extent that detection is prevented from failing, the power consumption can be reduced.

Figure 8:
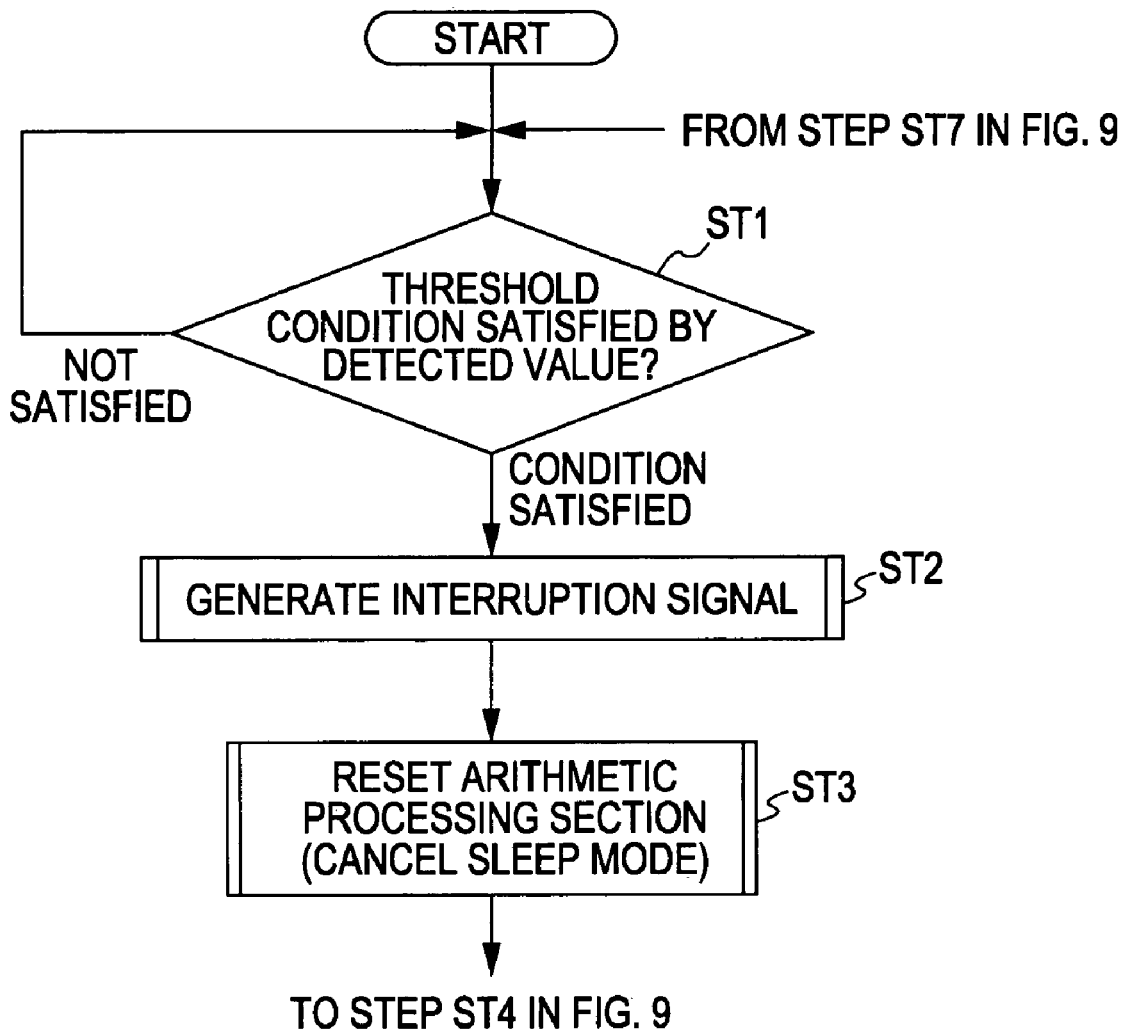
FIG. 8 is a flowchart showing an example of an activation process.
Figure 9:
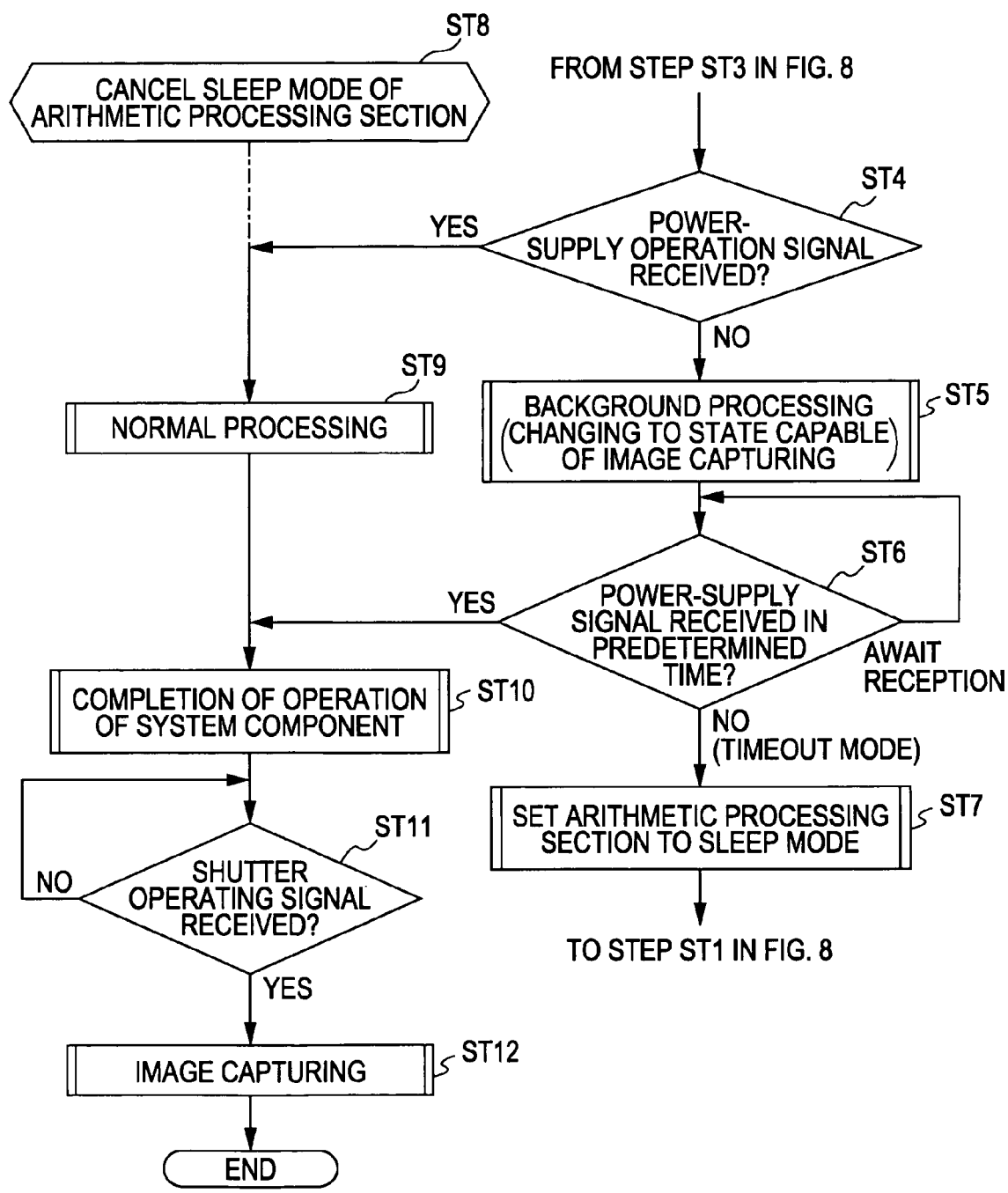
FIG. 9 is a flowchart showing a process flow continued from FIG. 8.

FIGS. 8 and 9 are flowcharts showing an example of a system activation process concerning the (1) analog system.

At first, in step ST1 in FIG. 8, after an analog signal is sent from the detecting unit 13 to the A/D converter 14, a digital signal obtained in conversion by the comparator 15 is sent to the comparator 15. In addition, threshold data is sent from the data storage section 16 to the comparator 15, and both are compared by the comparator 15. If the detection data satisfies a condition defined by the threshold data, the process proceeds to step ST2. If not, the detection is continuously monitored.

In step ST2, the comparator 15 generates an interruption signal for the arithmetic processing section 17, and, in the next step, the sleep state is canceled. In other words, the process proceeds to step ST3, and a state in which the arithmetic processing section 17 can perform processing with a predetermined operating speed. The process proceeds to step ST4.

In step ST4, it is determined whether or not the operation signal from the power supply switch has been sent to the second control unit 4b. If the operation signal has not been sent, the process proceeds to step ST5. If the operation signal has been sent, the process proceeds to step ST9.

In step ST5, supplying power to the system controller and the system configuration unit, initialization, etc., is initiated so as not to be noticed by the user (background processing). The device becomes ready for image capturing within a predetermined time, and the process proceeds to step ST6.

In step ST6, it is determined whether or not an operation on the power supply switch has been performed within a predetermined time. When a power-supply instruction is issued before a predetermined set time passes, the process proceeds to step ST10. Even if the set time has passed, when the power-supply instruction is not issued (at timeout), the process proceeds to step ST7. Determination concerning the operation signal from the power supply switch is performed until the set time passes.

In step ST7, the CPU core or the like forming the arithmetic processing section 17 is set to the sleep state. After that, the process returns to step ST1 in FIG. 8.

On the condition that, as shown in step ST8, when the power supply switch is operated, an external interruption signal is generated to return the arithmetic processing section 17 to a state capable of processing with the predetermined operating speed, in step ST9, the system activation process is normally performed in accordance with the power-supply instruction (this process is similar to that in the related art) before the process proceeds to step ST10.

In step ST10, the operation of the system configuration unit, for example, the image signal processing section 5a, is completed. A backlight, or the like, included in the image display section 5b emits light to display a screen.

It takes almost no time from the time the power supply switch is performed in step ST6 until the process proceeds to step ST10. In other words, instantly after the user operates the power supply switch, image capturing preparation is established.

The process proceeds to step ST11, and, in step ST11, on the basis of an operation on the shutter release button, it is determined whether or not an image capturing instruction has been issued. If an image-capturing-instruction signal has been sent to the system, the process proceeds to step ST12 and an image capturing process is initiated.

In the (1) analog system, by allowing the system controller to have threshold data, flexible determination using software can be performed. Accordingly, a detected value obtained by the detecting unit 13 can be used for other uses such as image stabilizing. In addition, the detecting unit 13 does not need to include any communication circuit for communicating with a comparator and the system controller. Thus, the detecting unit 13 has an advantage in reducing the size of the detecting unit 13, reducing the number of components, and reducing an area and space for installation.

Next, the (2) digital system is described below.

Figure 10:
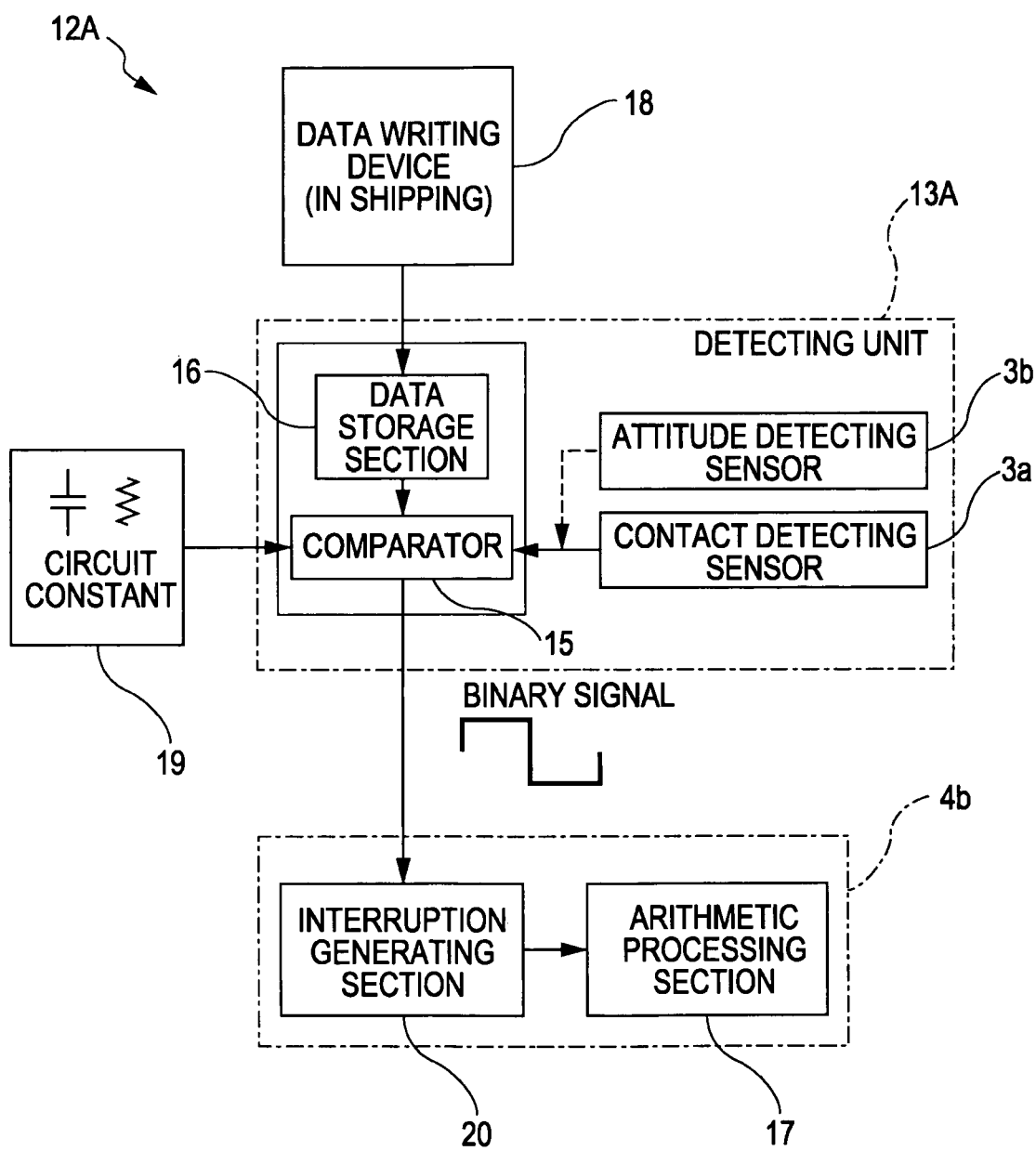
FIG. 10 is a block diagram showing a main part of another configuration example.

FIG. 10 is a block diagram showing a main part of an example configuration 12A of the (2-1) binarization system.

A detecting unit 13A includes a data storage section 16 and a comparator 15 other than sensors. An electrostatic sensor serving as a contact detecting sensor 3a and an angular velocity sensor serving as an attitude detecting sensor 3b are used. Each sensor output signal is sent to the comparator 15.

The data storage section 16 stores threshold data that is written in shipping by a data writing device 18. The threshold data is read and sent to the comparator 15.

The comparator 15 performs comparison operations between a sensor detection signal and a signal representing the threshold data. As a result, when the sensor detection value satisfies a condition represented by the threshold data, it is recognized that, for example, the user touches a predetermined area of a camera, or changing to the image capturing mode is initiated such that the user holds the camera. A binary signal (e.g., an H-level signal) representing the result of the recognition is output to the second control unit 4b. When the sensor detection value does not satisfy the condition represented by the threshold data, it is determined that the image capturing mode is not set, or temporary or accidental contact or change in attitude or disturbance such as noise occurs. A binary signal (e.g., an L-level signal) representing the signal is output to the second control unit 4b.

In addition to the configuration using the data storage section 16 for storing the threshold data, there is, for example, a configuration in which a threshold value is set by adjusting, in shipping, a constant value set for the comparator 15 by an external circuit 19. In FIG. 10, both configurations are shown for brevity of description.

A second control unit 4b includes an interruption generating section 20 and an arithmetic processing section 17 (such as a CPU core or ASIC). An output signal of the comparator 15, that is, a binarized signal, is sent to the interruption generating section 20. When the interruption generating section 20 receives a signal representing the start of changing to the image capturing mode, the arithmetic processing section 17 is interrupted to cancel a sleep state, so that the arithmetic processing section 17 enters a state in which the CPU core or the like can perform processing with a predetermined operating speed.

Figure 11:
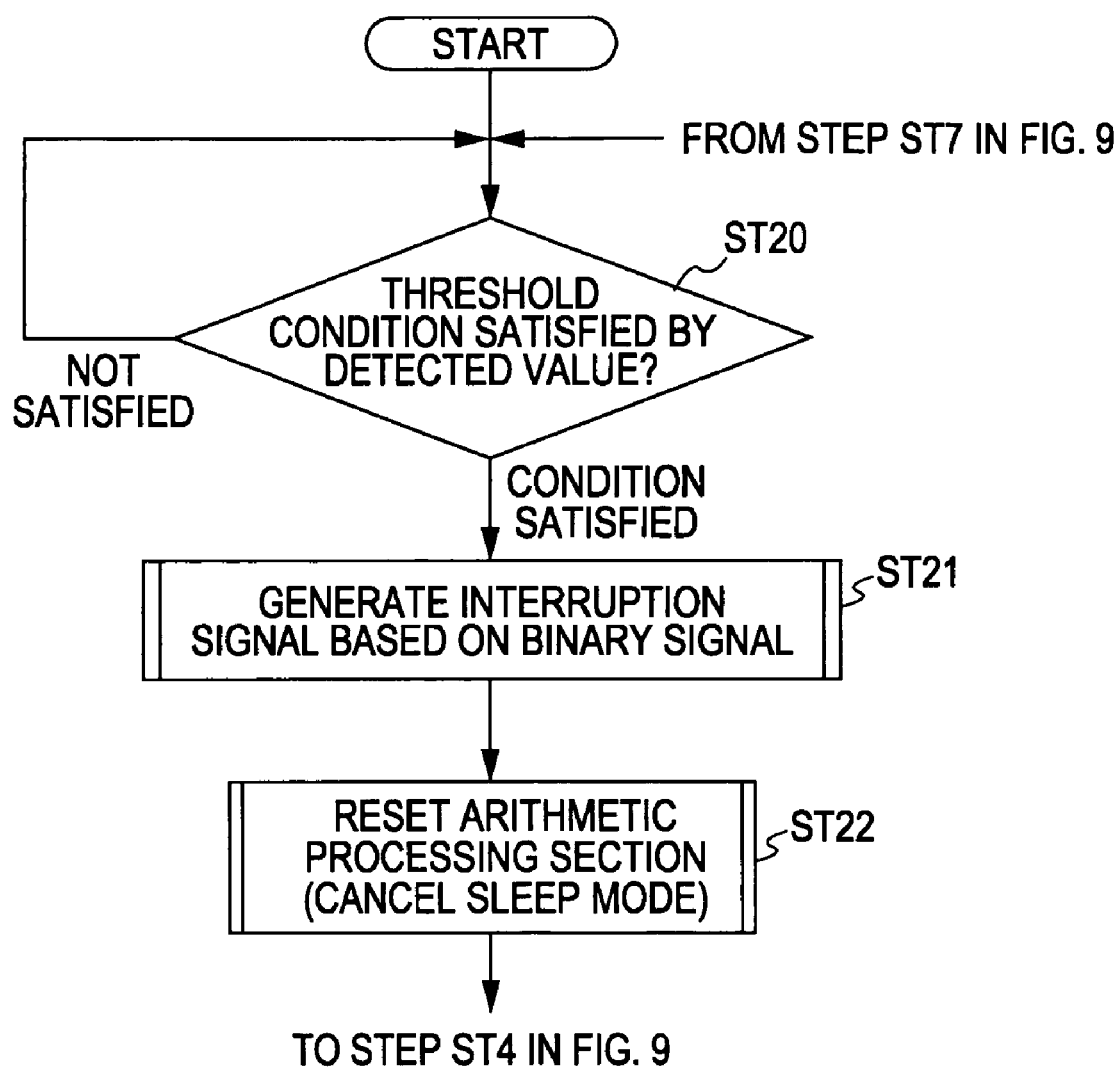
FIG. 11 is a flowchart showing a main part of an example of a system activation process concerning the configuration shown in FIG. 10.

FIG. 11 is a flowchart showing a main part of an example of the system activation process concerning the (2-1) binarization system. FIG. 11 shows only differences from the example described concerning the (1) analog system.

In step ST20, the comparator 15 compares the sensor detection signal and a threshold data signal. If the sensor detection value satisfies a condition defined by the threshold value, the process proceeds to step ST21. If not, the sensor detection signal is continuously monitored.

In step ST21, in response to the binary signal from the comparator 15, the interruption generating section 20 generates an interruption signal for the arithmetic processing section 17, and the sleep state of the arithmetic processing section 17 is canceled. This allows the arithmetic processing section 17 to perform processing with a predetermined operating speed in step ST22. After that, the process proceeds to step ST4 in FIG. 9.

The subsequent processing is as described with reference to FIG. 9. However, after, in step ST7, the CPU core or the like forming the arithmetic processing section 17 is set to the sleep state, the process returns to step ST20 in FIG. 11. In the sleep state, the power consumption is low since only the interruption generating section 20 operates in the second control unit 4b.

Figure 12:
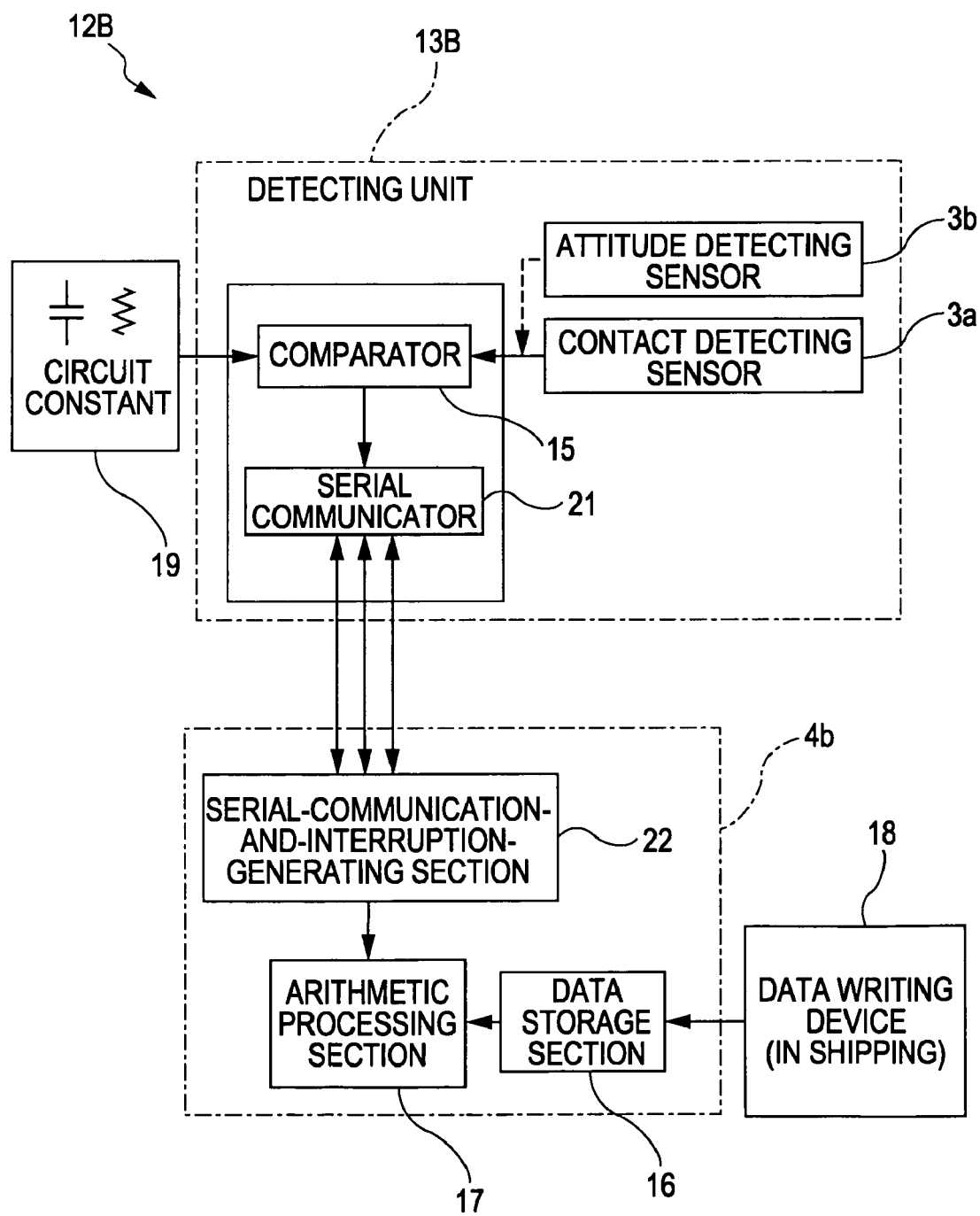
FIG. 12 is a block diagram showing a main part of still another example configuration.

FIG. 12 is a block diagram showing a main part of an example configuration 12B in the (2-2) serial system.

Differences from the configuration shown in FIG. 10 are described below.

A detecting unit 13B includes a serial communicator 21 at a stage after a comparator 15.

A second control unit 4b includes a serial-communication-and-interruption-generating section 22 for exchanging information with the serial communicator 21.

In a configuration in which an arithmetic processing section 17 compares detection data sent as serial data from the detecting unit 13B with threshold data stored in a data storage section 16, the data storage section 16 is included in a second control unit 4b, and, in shipping, a data writing device 18 is used to write the threshold data or the like in the data storage section 16. For example, a comparator 15 in the detecting unit 13B is not necessary and a sensor detection signal is sent to the second control unit 4b through the serial communicator 21.

In this example, the data storage section 16 for storing the threshold data may be provided in the detecting unit 13A similarly to FIG. 10. For brevity of description, FIG. 12 shows both a configuration in which the data storage section 16 for storing the threshold data is provided in the second control unit 4b, and a configuration in which a threshold value is set by adjusting, in shipping, a constant value set for the comparator 15 by an external circuit 19. In a form that uses both comparison using the comparator 15 in the detecting unit 13B and comparison performed by the arithmetic processing section 17 using the data storage section 16, Implementation of double determination can enhance reliability, and is useful in verifying a determination result and backing up the comparison (for example, when the comparator 15 malfunctions).

The comparator 15 or the arithmetic processing section 17 performs comparison operations between the sensor detection value and the threshold data. When the result of the comparison indicates that the sensor output value satisfies a condition represented by the threshold data, it is recognized that, for example, the user touches a predetermined area of a camera, or changing to the image capturing mode is initiated such that the user holds the camera. Data representing the recognition result or the sensor detection data is transmitted from the serial communicator 21 to the serial-communication-and-interruption-generating section 22. If the sensor output value does not satisfy the condition represented by the threshold data, it is determined that the image capturing mode is not set, or temporary or accidental contact or change in attitude or disturbance such as noise occurs. Data representing the result or the sensor detection data is transmitted from the serial communicator 21 to the serial-communication-and-interruption-generating section 22. Various types of formats (SIO, UART, 12C, etc.,) may be used for a serial communication format.

In a form in which the detecting unit 13B includes the comparator 15, when the serial-communication-and-interruption-generating section 22 receives, for example, the signal representing the start of changing to the image capturing mode, the arithmetic processing section 17 is interrupted to cancel its sleep state, whereby the CPU core or the like is in a state capable of performing processing with a predetermined operating speed.

In a form in which the second control unit 4b includes the data storage section 16, when the serial-communication-and-interruption-generating section 22 receives the sensor detection data, an interruption is generated allowing the arithmetic processing section 17 to compare the sensor detection value and the threshold value from the data storage section 16. As a result, when it is determined that changing to the image capturing mode is started, the CPU core or the like is in a state capable of performing processing with a predetermined operating speed.

Figure 13:
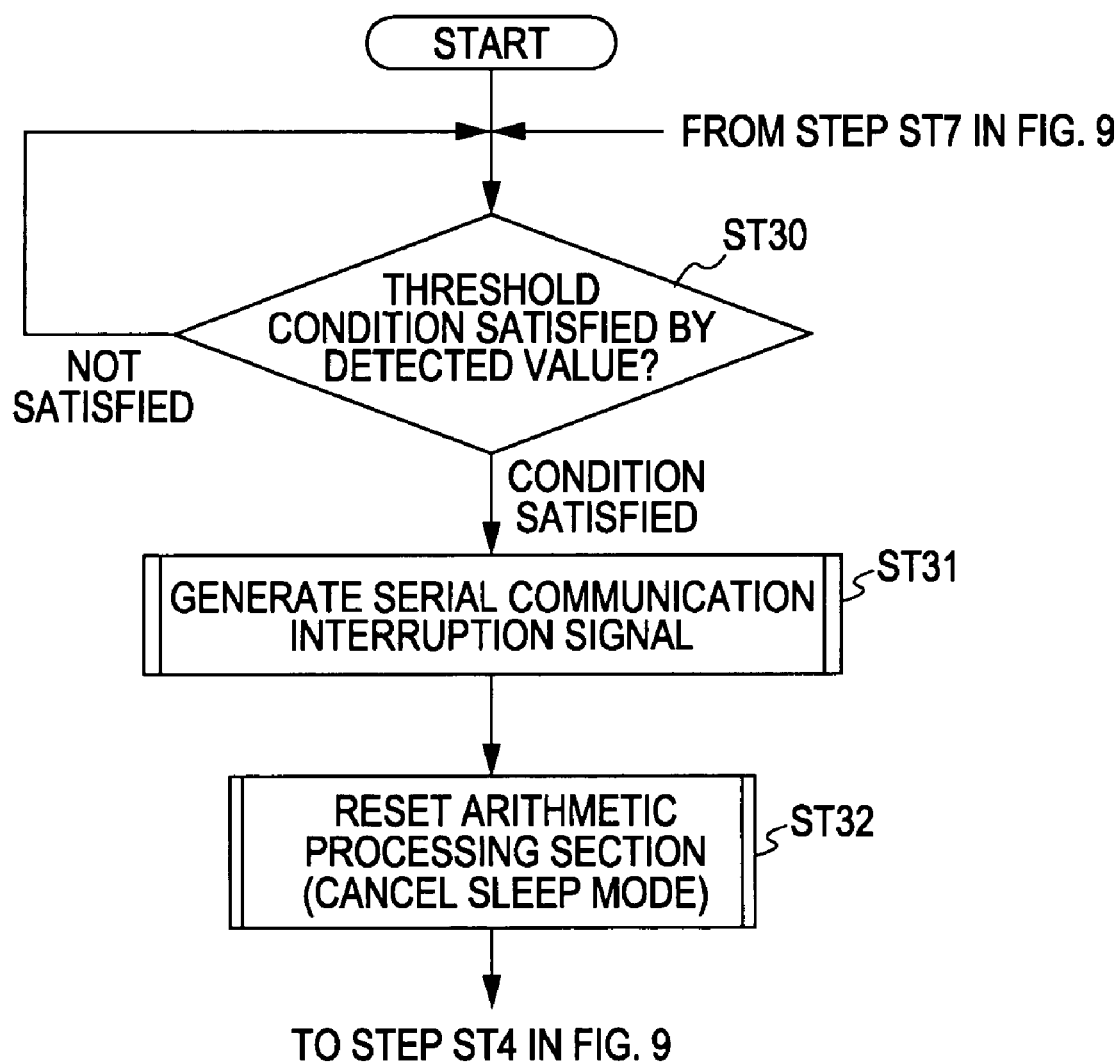
FIG. 13 is a flowchart showing a main part of an example of a system activation process concerning the configuration shown in FIG. 12.

FIG. 13 is a flowchart showing a main part of an example of the system activation process concerning the (2-2) serial system. FIG. 13 shows only differences from the example of the process described concerning the (1) analog system.

In step ST30, for example, the sensor detection value and the threshold value are compared by the comparator 15. If the sensor detection value satisfies a condition defined by the threshold value, the process proceeds to step ST31. If not, the sensor detection value is continuously monitored.

In step ST31, the comparator 15 interrupts the arithmetic processing section 17 through the serial communicator 21, and the sleep state is canceled in the arithmetic processing section 17. This allows the arithmetic processing, section 17 in step ST32 to be in a state capable of performing processing with a predetermined operating speed.

The subsequent processing is as described with reference to FIG. 9. After the CPU core or the like forming the arithmetic processing section 17 is set to the sleep state in step ST7, the process returns to step ST30 in FIG. 13.

Since, in this system, serial data communication is used for information transfer between the detecting unit 13B and the second control unit 4b, this system has advantages such as ability to transmit and receive a more amount of information compared with the (2-1) binarization system. Accordingly, also an arithmetic processing section using a CPU or the like can re-compare data. Thus, flexible responses are possible concerning sensor recognition. In addition, an interruption is generated such that the detection data from the detecting unit 13B is sent to the second control unit 4b through serial communication. Thus, the second control unit 4b can operate in a state (power saving mode) having low power consumption.

As described above, in the (1) analog system, in comparison between the detecting unit and the second control unit 4b, the configuration of the detecting unit is simplified. In the (2) digital systems, the configuration of the second control unit 4b is simplified.

Next, form (III), that is, the configuration for enhancing detection accuracy by combining detection of contact with the device and detection of a change in attitude of the device, is described below.

For example, when an electrostatic sensor detects contact of fingers with a camera body, and an angular velocity sensor detects, as a change in velocity, a change in attitude in holding the camera, it is determined that the image capturing mode is set, and the system activation process is performed.

Figure 14:
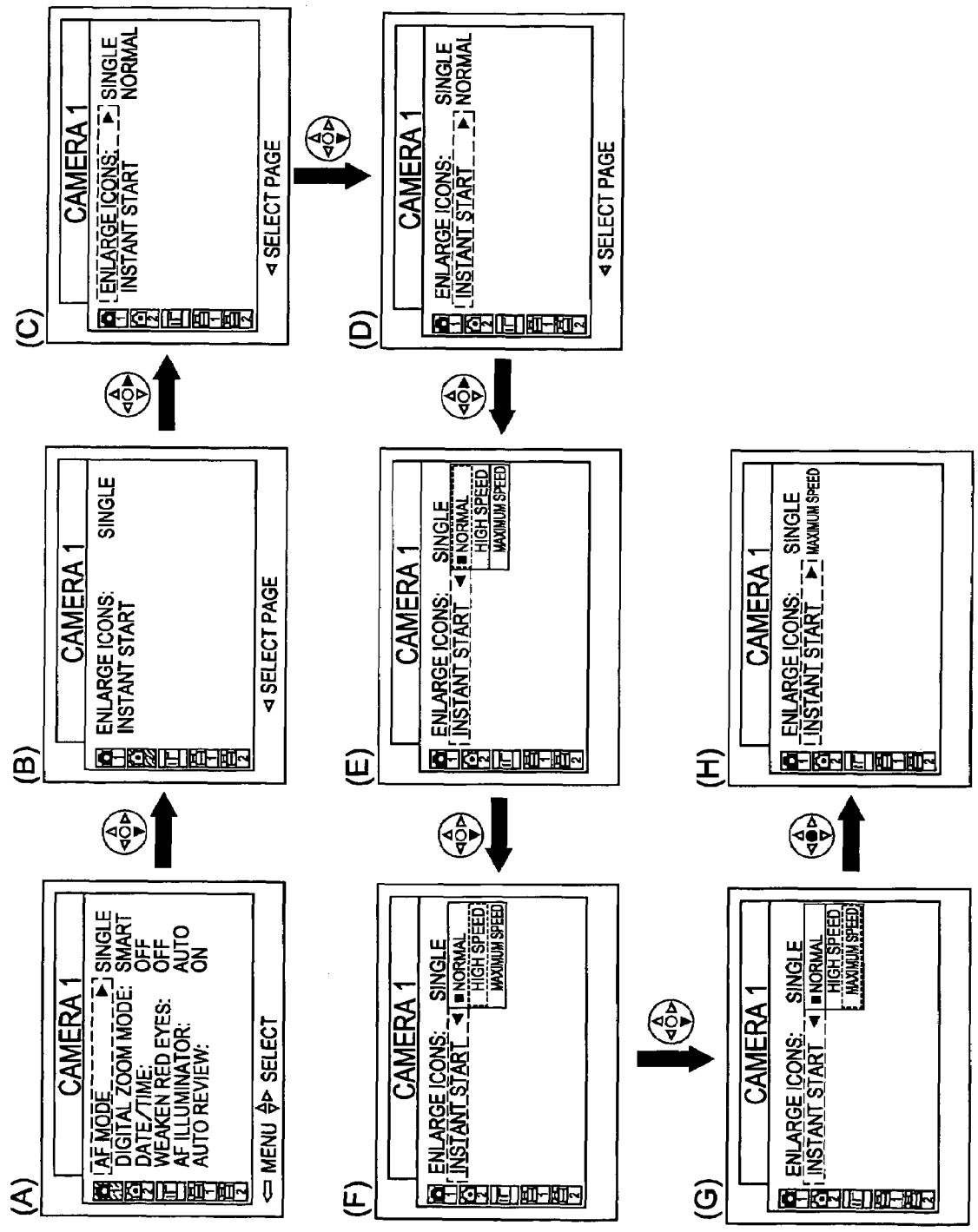
FIG. 14 is an illustration of examples of settings for activation.

FIG. 14 shows a setting method example concerning system activation. Examples of screens are shown in portions (A) to (H) of FIG. 14. In this setting method example, as setting items concerning three types of mode, "INSTANT START," "NORMAL," "HIGH SPEED," "MAXIMUM SPEED," are selectable.

Portions (A) to (C) are similar to those in FIG. 5. In each of portions (C) and (D), for the item "INSTANT START," a "NORMAL" mode is set.

The user performs a "right" directional operation in a state in which the cursor is positioned in the item "INSTANT START" as shown in portion (D) of FIG. 14, whereby, as shown in portion (E), for the "INSTANT START," one of three modes becomes selectable.

Since, in this setting method example, the "NORMAL" mode has been set, by performing a "downward" directional operation with a cross key or the like, as shown in portion (F) of FIG. 14, the user can position the cursor on a "HIGH SPEED" mode. By further performing the "downward" directional operation, as shown in portion (G) of FIG. 14, the user can position the cursor on a "MAXIMUM SPEED" mode.

After that, by confirming the selected item, that is, pressing the center part (determination button) of the cross key or the like, the screen is changed to the screen shown in portion (H) of FIG. 14 and the setting operation finishes.

The above consecutive operations enable the "INSTANT START" to be set to a desired mode.

Next, an example configuration in which the (1) analog system and the (2) digital systems are applied to form (III) is described below.

At first, the configuration form of the form (I) is described below. In FIG. 7, for example, the detecting unit 13 includes an electrostatic sensor and an angular velocity sensor, or an acceleration sensor, and an analog signal (indicated by the broken line arrow in FIG. 7) output by each sensor is sent to the A/D converter 14. The data storage section 16 stores, in units of sensors, threshold data that is written in shipping by using the data writing device 18. The threshold data of each sensor is read and sent to the comparator 15.

Figure 15:
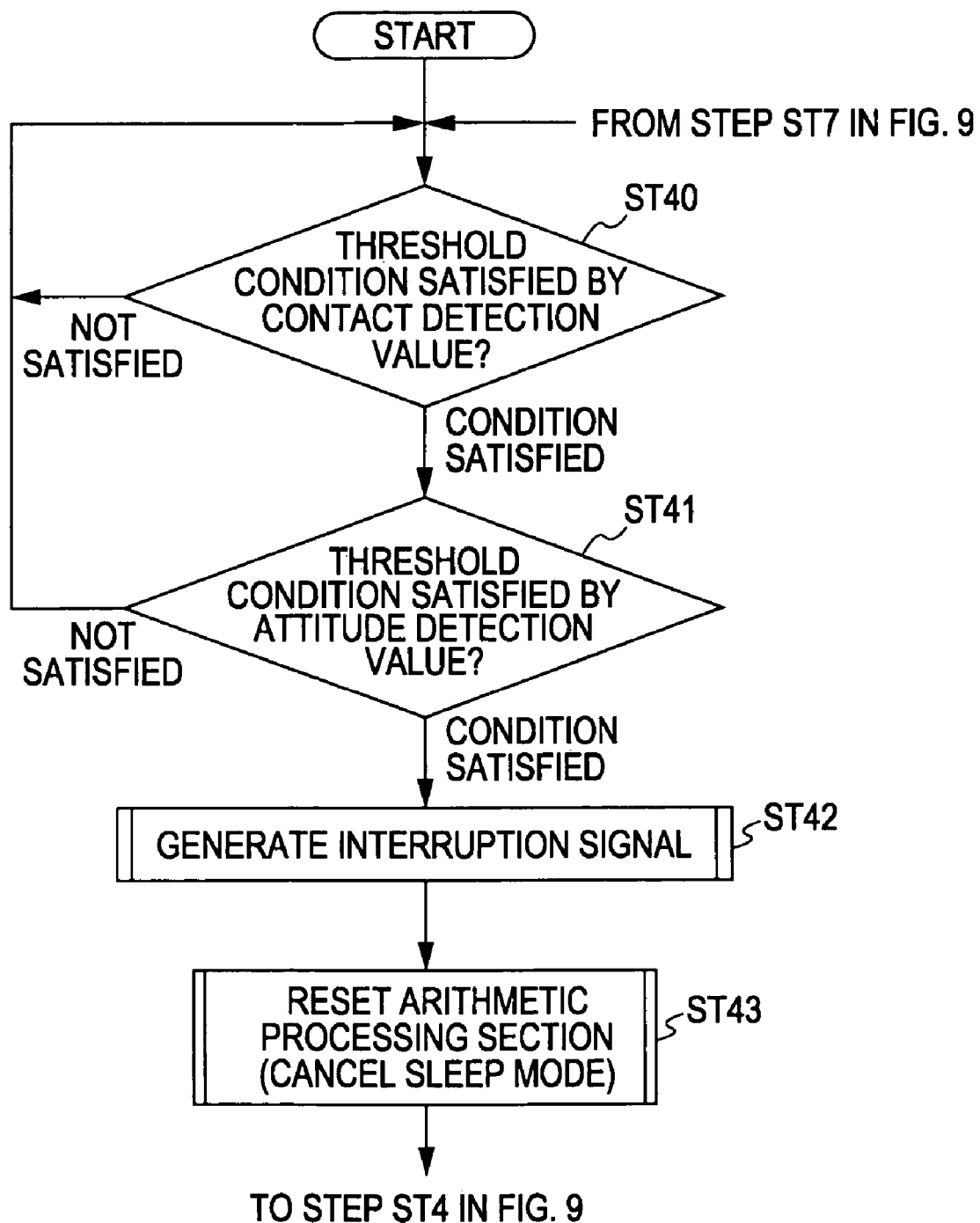
FIG. 15 is a flowchart showing a main part of an example of a system activation process in a case in which a high speed mode is set.

FIG. 15 is a flowchart showing a main part of the example of the system activation process in a case in which the above "HIGH SPEED" mode is set. FIG. 15 shows differences from the example of the process described with reference to FIG. 8.

After a detection signal of each sensor is sent to the second control unit 4b, in step ST40, detection data by the electrostatic sensor and the threshold data from the data storage section 16 are sent and compared with each other in the comparator 15. If the detection data satisfies a condition defined by the threshold data, the process proceeds to step ST41. If not, the sensor detection value is continuously monitored.

In step ST41, detection data (data obtained by A/D conversion) by the angular velocity sensor (or acceleration sensor) and the threshold data from the data storage section 16 are sent and compared with each other in the comparator 15. If the detection data satisfies a condition defined by the threshold data, the process proceeds to step ST42. If not, the process returns to step ST40, and the sensor detection data is continuously monitored.

In step ST42, processing that is necessary for awaking the arithmetic processing section 17 from the sleep state is performed. In other words, the comparator 15 generates an interruption signal for the arithmetic processing section 17, whereby its sleep state is canceled. This allows the arithmetic processing section 17 in step ST43 to perform processing with a predetermined operating speed. The process proceeds to step ST4 shown in FIG. 9.

The subsequent processing is as described with reference to FIG. 9. After, in step ST7, the CPU core or the like forming the arithmetic processing section 17 is set to the sleep state, the process returns to step ST40 shown in FIG. 15.

In this example, the detection with the electrostatic sensor, that is, contact detection, is initially performed. In addition to that, device attitude detection may initially be performed. For example, in step ST40, the detection data with the angular velocity sensor or acceleration sensor and the threshold data may be compared with each other, and, in step ST41 the detection data with the electrostatic sensor and the threshold data may be compared with each other.

In any case, the contact detection and the attitude detection ensure determining that the image capturing mode is set, and the system activation is performed.

Figure 16:
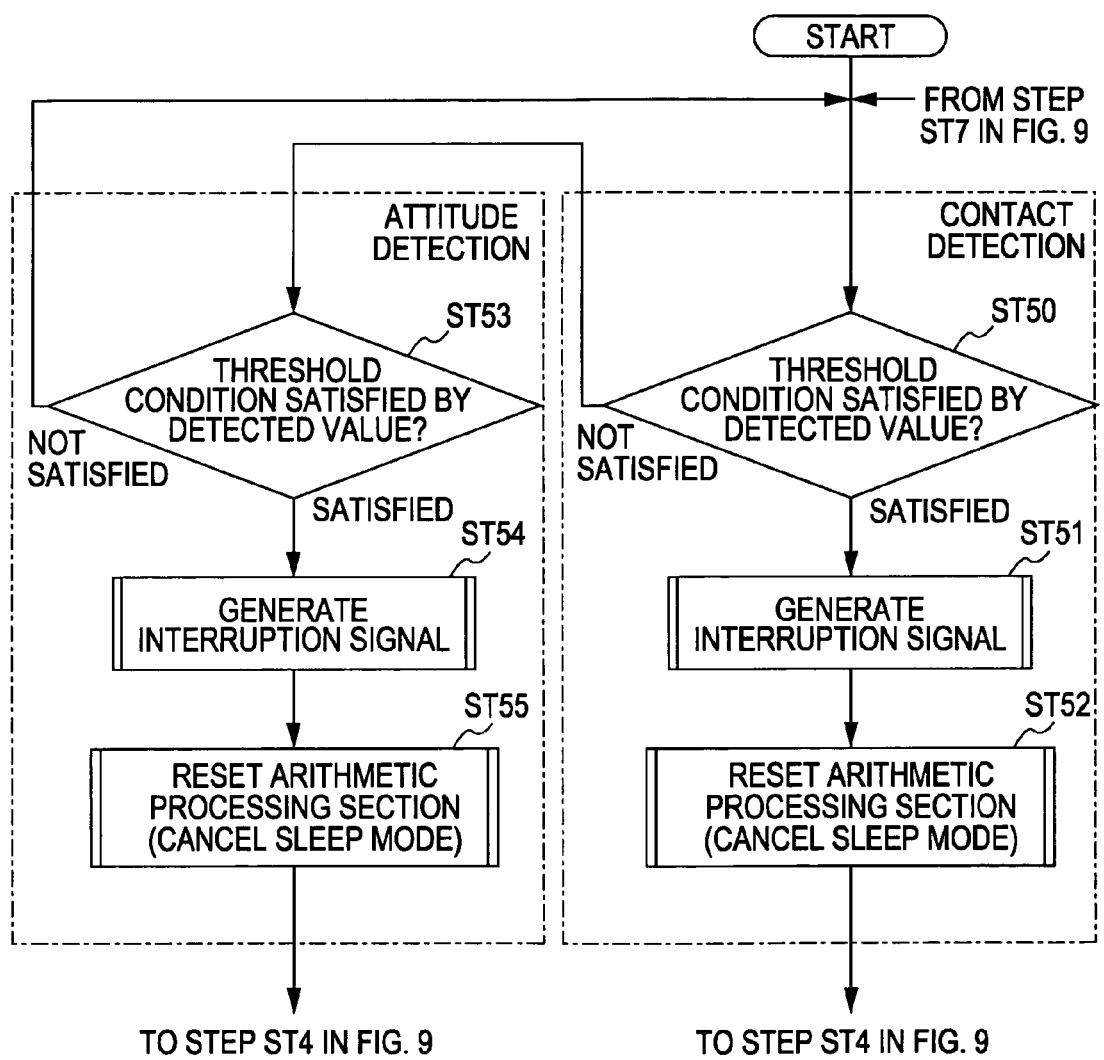
FIG. 16 is a flowchart showing a main part of an example of a system activation process in a case in which a maximum speed mode is set.

FIG. 16 is a flowchart showing a main part of an example of the system activation process in a case in which the above "MAXIMUM SPEED" mode is set. FIG. 16 shows differences from those in the example of the process described with reference to FIG. 8.

After the detection signal of each sensor is sent to the second control unit 4b, in step ST50, the detection data (data obtained by A/D conversion) with the electrostatic sensor and the threshold data from the data storage section 16 are sent and compared with each other in the comparator 15. If the detection data satisfies a condition defined by the threshold data, the process proceeds to step ST51. If not, the process proceeds to ST53.

In step ST51, processing that is necessary for awaking the arithmetic processing section 17 from the sleep state is performed. In other words, the comparator 15 generates an interruption signal for the arithmetic processing section 17, whereby its sleep state is canceled. This allows the arithmetic processing section 17 in step ST52 to perform processing with a predetermined operating speed. The process proceeds to step ST4 shown in FIG. 9.

In step STS3, the detection data (data obtained by A/D conversion) with the angular velocity sensor or acceleration sensor and the threshold data from the data storage section 16 are sent and compared with each other in the comparator 15. If the detection data satisfies a condition defined by the threshold data, the process proceeds to step ST54. If not, the process returns to step ST50, and the sensor detection value is continuously monitored.

In step ST54, processing that is necessary for awaking the arithmetic processing section 17 from the sleep state is performed. In other words, the comparator 15 generates an interruption signal for the arithmetic processing section 17, whereby its sleep state is canceled. This allows the arithmetic processing section 17 in step ST55 to perform processing with a predetermined operating speed. The process proceeds to step ST4 shown in FIG. 9.

Although the subsequent processing is as described with reference to FIG. 9, in step ST7, the CPU core or the like forming the arithmetic processing section 17 is set to the sleep state before the process returns to step ST50 shown in FIG. 16.

In FIG. 16, for ease of understanding, the contact detection and the attitude detection are separately shown, but steps ST51 and ST54 are substantially identical in processing and steps ST52 and ST55 are substantially identical in processing. Thus, for example, if, in step ST50, the contact detection value satisfies a threshold condition, the process may proceed to step ST54 (steps ST51 and ST52 are not necessary in this case).

Although, in this example, the detection with the electrostatic sensor, that is, the contact detection, is initially performed, this example is not limited to this manner. The device attitude detection may initially be performed, that is, for example, in step ST50, the detection data with the angular velocity sensor or acceleration sensor and the threshold data may be compared with each other, and, in step ST53, the detection data with the electrostatic sensor and the threshold data may be compared with each other.

In any case, when the contact detection or the attitude detection indicates that the image capturing mode is set, the system activation process is immediately performed.

Next, the (2-1) binarization system is described below.

In FIG. 10, for example, the detecting unit 13A includes an electrostatic sensor or angular velocity sensor, or an acceleration sensor. An output signal from each sensor is sent to the comparator 15. The data storage section 16 stores, in units of sensors, threshold data that is written in shipping by using the data writing device 18. The threshold data of each sensor is read and sent to the comparator 15. Alternatively, by using the external circuit 19 for the comparator 15 to adjust a constant value for each sensor in shipping, each threshold value is set.

An output of the comparator 15, that is, a binary signal, is sent to the interruption generating section 20, whereby the arithmetic processing section 17 is interrupted.

A main part of an example of the system activation process in a case in which the "HIGH SPEED" mode is set is described below with reference to FIG. 15.

After the detection signal of each sensor is sent to the second control unit 4b, in step ST40, the detection signal with the electrostatic sensor and a signal representing a threshold value for the detection signal are compared with each other by the comparator 15. If the sensor detection signal satisfies a condition defined by the threshold value, the process proceeds to step ST41. If not, the sensor detection signal is continuously monitored.

In step ST41, the detection signal with the angular velocity sensor or acceleration sensor and the threshold value signal are sent and compared with each other in the comparator 15. If the sensor detection value satisfies the condition defined by the threshold value, the process proceeds to step ST42. If not, the process returns to step ST40, and the detection value is continuously monitored.

In step ST42, after the binary signal is sent from the comparator 15 to the interruption generating section 20, an interruption signal generated by the interruption generating section 20 is sent to the arithmetic processing section 17, whereby its sleep state is canceled. This allows the arithmetic processing section 17 in step ST43 to perform processing with a predetermined operating speed. The process proceeds to step ST4 shown in FIG. 9.

Although the subsequent processing is as described with reference to FIG. 9, the CPU core or the like forming the arithmetic processing section 17 is set to the sleep state before the process returns to step ST40 shown in FIG. 15.

In a form in which the device attitude detection is initially performed, for example, in step ST40, the detection value with the angular velocity sensor or acceleration sensor and the threshold value may be compared with each other, and, in step ST41, the detection value with the electrostatic sensor and the threshold value may be compared with each other.

In any case, on the basis of the binary signal, it is ensured that the image capturing mode is set by the contact detection and the attitude detection.

In the example of the system activation process in the case in which the "MAXIMUM SPEED" is set, in FIG. 16, at first, the detection signal of each sensor is sent to the second control unit 4b.

In step ST50, the detection signal with the electrostatic sensor and a signal representing a threshold value of the detection signal are compared with each other by the comparator 15. If the sensor detection signal satisfies a condition defined by the threshold value, the process proceeds to step ST51. If not, the process proceeds to step ST53.

In step ST51, the binary signal from the comparator 15 is received by the interruption generating section 20. This generates an interruption signal for the arithmetic processing section 17, whereby its sleep state is canceled. In step ST52, the arithmetic processing section 17 enters a state capable of performing processing with a predetermined operating speed. The process proceeds to step ST4 shown in FIG. 9.

In step ST53, the detection signal with the electrostatic sensor or acceleration sensor and the threshold value signal from the data storage section 16 are sent and compared with each other in the comparator 15. If the sensor detection value satisfies a condition defined by the threshold value, the process proceeds to step ST74. If not, the process returns to step ST50, and the sensor detection value is continuously monitored.

In step ST54, the binary signal is received from the comparator 15 by the interruption generating section 20. This generates an interruption signal for the arithmetic processing section 17, whereby its sleep state is canceled. In step ST55, the arithmetic processing section 17 enters a state capable of performing processing with a predetermined operating speed. The process proceeds to step ST4 shown in FIG. 9.

Although the subsequent processing is as described with reference to FIG. 9, in step ST7, the CPU core or the like forming the arithmetic processing section 17 is set to the sleep state before the process returns to step ST50 shown in FIG. 16.

In the form in which the device attitude detection is initially performed, for example, in step ST50, the detection value with the angular velocity sensor or acceleration sensor and the threshold value may be compared with each other, and, in step ST53, the detection value with the electrostatic sensor and the threshold value may be compared with each other.

In any case, when, on the basis of the binary signal, it is ensured that the image capturing mode is set by the contact detection or attitude detection, the system activation process is immediately performed.

Next, the form of the (2-2) serial system is described below.

In FIG. 12, for example, the detecting unit 13B includes an electrostatic sensor and angular velocity sensor, or an acceleration sensor. An output signal of each sensor is sent to the comparator 15, or is sent to the arithmetic processing section 17 through serial communication. The data storage section 16 stores, in units of sensors, threshold data that is written in shipping by using the data writing device 18. Threshold data of each sensor is read and sent to the arithmetic processing section 17. Alternatively, by using the external circuit 19 for the comparator 15 to adjust a constant value for each sensor, each threshold value is set.

The output signal of the comparator 15 is sent to the serial-communication-and-interruption-generating section 22 included in the second control unit 4b through the serial communicator 21. An interruption signal generated by the serial communicator 21 is sent to the arithmetic processing section 17. Alternatively, detection data from the detecting unit 13B is transmitted and compared with the threshold value from the data storage section 16 in the arithmetic processing section 17.

In the example of the system activation process in the case in which the "HIGH SPEED" mode is set, in FIG. 15, the detection signal of each sensor is sent to the second control unit 4b.

In step ST40, for example, the detection signal with the electrostatic sensor and a signal representing a threshold value of the detection signal are sent and compared with each other in the comparator 15. If the sensor detection value satisfies a condition defined by the threshold value, the process proceeds to step ST41. If not, the sensor detection value is continuously monitored.

In step ST41, the detection signal with the angular velocity sensor or acceleration sensor and the threshold value signal are compared by the comparator 15. If the sensor detection value satisfies a condition defined by the threshold value, the process proceeds to step ST42. If not, the process returns to step ST40, and the sensor detection value is continuously monitored.

In step ST42, the signal is sent from the comparator 15 to the serial-communication-and-interruption-generating section 22 through the serial communicator 21, and an interruption signal generated by the serial-communication-and-interruption-generating section 22 is sent to the arithmetic processing section 17, whereby its sleep state is canceled. This allows the arithmetic processing section 17 in step ST43 to perform processing with a predetermined operating speed. The process proceeds to step ST4 shown in FIG. 9.

Although the subsequent processing is as described with reference to FIG. 9, in step ST7, the CPU core or the like forming the arithmetic processing section 17 is set to the sleep state before the process returns to step ST40 shown in FIG. 15.

Although, in this example, the detection with the electrostatic sensor, or the contact detection, is initially performed, a detection manner is not limited to this example. By initially performing the device attitude detection, for example, in step ST40, the detection value with the angular velocity sensor or acceleration sensor and the threshold value may be compared, and, in step ST41, the detection value with the electrostatic sensor and the threshold value may be compared.

In any case, serial communication is used to ensure determining that the image capturing mode is set by the contact detection and the attitude detection, and the system activation process is performed.

In a form that does use the comparator 15 in the detecting unit 13B, in steps ST40 and ST41, the detection data of each sensor is sent to the arithmetic processing section 17 through serial communication, whereby the arithmetic processing section 17 is interrupted. In the arithmetic processing section 17, each detection value is compared with the threshold value from the data storage section 16. When the comparison result indicates the start of changing to the image capturing mode, the process directly proceeds from step ST41 to step ST43, and the CPU core or the like enters a state capable of performing processing with a predetermined operating speed.

In the example of the system activation process in the case in which the "MAXIMUM SPEED" mode is set, in FIG. 16, at first, the detection signal of each sensor is sent to the second control unit 4b.

In step ST50, for example, the detection signal with the electrostatic sensor and the threshold value signal are compared by the comparator 15. If the sensor detection value satisfies a condition defined by the threshold value, the process proceeds to step ST51. If not, the process proceeds to step ST53.

In step ST51, the signal is sent from the comparator 15 to the serial-communication-and-interruption-generating section 22 through the serial communicator 21, whereby an interruption signal is generated for the arithmetic processing section 17, and its sleep state is canceled. In step ST53, the arithmetic processing section 17 enters a state capable of performing processing with a predetermined operating speed. The process proceeds to step ST4 shown in FIG. 9.

In step ST53, the detection signal with the angular velocity sensor or acceleration signal and the threshold value signal from the data storage section 16 are sent and compared with each other in the comparator 15. If the sensor detection value satisfies a condition defined by the threshold value, the process proceeds to step ST54. If not, the process returns to step ST50, and the sensor detection value is continuously monitored.

In step ST54, the signal is sent from the comparator 15 to the serial-communication-and-interruption-generating section 22 through the serial communicator 21. This generates an interruption signal for the arithmetic processing section 17, and its sleep state is canceled. In step ST55, the arithmetic processing section 17 enters a state capable of performing processing with a predetermined operating speed. The process proceeds to step ST4 shown in FIG. 9.

Although the subsequent processing is as described with reference to FIG. 9, in step ST7, the CPU core or the like forming the arithmetic processing section 17 is set to the sleep state before the process returns to step ST50 shown in FIG. 16.

In a form in which the device attitude detection is initially performed, for example, in step ST50, the detection value with the angular velocity sensor or acceleration sensor and the threshold value may be compared with each other, and, in step ST53, the detection value with the electrostatic sensor and the threshold value may be compared with each other.

In any case, when serial communication is used to find that the image capturing mode is set by the contact detection or the attitude detection, the system activation process is immediately performed.

In the form that does use the comparator 15 in the detecting unit 13B, in steps ST50 and ST53, the detection data of each sensor is sent to the arithmetic processing section 17 through serial communication, and each detection value is compared with the threshold value from the data storage section 16 by the arithmetic processing section 17. When the comparison result indicates the start of changing to the image capturing mode, the process proceeds to step ST52 or ST55, and the CPU core of the like enters a state capable of performing processing with a predetermined operating speed.

According to the above-described configurations, for example, the following advantages are obtained.

Regarding Activating Functionality of System

In an image capturing device of the related art, it takes a time of approximately one second after pressing a power supply switch to completion of activation, even if the image capturing device has fast activating functionality. Accordingly, if a user of the device has a moment for capturing an image of a subject that passes instantly, a situation in which the user fails to perform image capturing occurs. Unlike that, as described above, by using a sensor, such as an electrostatic sensor or angular velocity sensor, to detect changing to an image capturing mode and a preparatory operation, and activating the system of the device in background without informing the user, a state in which image capturing can be immediately initiated can be guaranteed. As a result, a possibility of missing a shutter release opportunity is decreased.

Regarding Power Consumption of System

It is difficult to reduce a system activation time to zero. Thus, for example, in a method for ensuring a state capable of image capturing by continuously supplying power to the system, in compensation therefor, an increase in power consumption inevitably shortens a time of driving using a battery. This causes a problem in convenience. Specifically, it is necessary to carry a charged battery or the like on hand. Unlike that, as described above, in order to monitor detection of contact with the device, detection of a device attitude, a switch operation, etc., the device is set to a standby state with minimum necessary power consumption, and, when it is found that an image capturing mode is set in the device, supplying of power to the system is fully initiated to change the device state to a state capable of image capturing. In other words, the system power is not continuously on, so that unnecessary power is prevented from being consumed in a waiting state in which the user does not intend to perform image capturing. Thus, a power saving effect is sufficiently obtained, and, in application of an embodiment of the present invention to portable devices, a battery life can be extended.

It should be understood by those skilled in the art that various modifications, combinations, sub-combinations and alterations may occur depending on design requirements and other factors insofar as they are within the scope of the appended claims or the equivalents thereof.

The invention claimed is:

1. An image capturing device, comprising:
   first control means for controlling image capturing, the first control means having a first power consumption;
   operation means including a switch;
   detecting means for detecting a change to an image capturing mode and for sending a signal representing the change to the image capturing mode;
   second control means for monitoring and processing the signal sent from the detecting means, the second control means having a power consumption less than the first power consumption; and
   a power supply for supplying power to the first control means, the second control means, and a functional section of the image capturing device,
   wherein a power saving state is changed to a power supplying state capable of image capturing by supplying power from the power supply to portions of the image capturing device including the first control means when the second control means receives the signal representing the change to the image capturing mode from the detecting means.

2. The image capturing device according to claim 1, wherein, after the power saving state is changed to the power supplying state capable of image capturing, when a power-supply operation is not performed, or the signal representing the change to the image capturing mode is not sent from the detecting means, the power supplying state is changed to the power saving state.

3. The image capturing device according to claim 1, wherein the detecting means is a sensor for detecting contact with the image capturing device.

4. The image capturing device according to claim 1, wherein the detecting means is a sensor for detecting a change in attitude of a body of the image capturing device.

5. The image capturing device according to claim 1, wherein the second control means sends a power-supply-instruction signal to the power supply after canceling a resting state of the second control means when the second control means receives the signal representing the change to the image capturing mode from the detecting means.

6. An activation method for an image capturing device having a function of controlling power supplying states including a first power control state capable of image capturing, the first power control state being a first power consumption, and a second power control state having a power consumption less than the first power consumption, the activation method comprising:
   in the second power control state, monitoring a switch operation and a change to an image capturing mode; and
   when the change to the image capturing mode is detected in the second power control state, changing the second power control state to the first power control state.

7. An image capturing device, comprising:
   a first controller operable to control image capturing, the first controller having a first power consumption;
   an operation section including a switch;
   a detector operable to detect a change to an image capturing mode and to send a signal representing the change to the image capturing mode;
   a second controller operable to monitor and process the signal sent from the detector, the second controller having a power consumption less than the first power consumption; and
   a power supply operable to supply power to the first controller, the second controller, and a functional section of the image capturing device, wherein a power saving state is changed to a power supplying state capable of image capturing by supplying power from the power supply to portions of the image capturing device including the first controller when the second controller receives the signal representing the change to the image capturing mode from the detector.

* * * * *